(12) United States Patent
Macnaughtan et al.

(10) Patent No.: US 8,787,171 B2
(45) Date of Patent: Jul. 22, 2014

(54) EFFICIENT COLLECTION OF WIRELESS TRANSMITTER CHARACTERISTICS

(75) Inventors: Malcolm David Macnaughtan, Cherry Brook (AU); Christopher Ridgway Drane, Pymble (AU); Stephen Frank Brown, West Ryde (AU); Craig Andrew Scott, Mortdale (AU)

(73) Assignee: WaveMarket, Inc., Emeryville, CA (US)

( * ) Notice: Subject to any disclaimer, the term of this patent is extended or adjusted under 35 U.S.C. 154(b) by 494 days.

(21) Appl. No.: 12/736,431

(22) PCT Filed: Apr. 7, 2009

(86) PCT No.: PCT/AU2009/000436
§ 371 (c)(1),
(2), (4) Date: Oct. 7, 2010

(87) PCT Pub. No.: WO2009/124348
PCT Pub. Date: Oct. 15, 2009

(65) Prior Publication Data
US 2011/0026506 A1    Feb. 3, 2011

Related U.S. Application Data

(60) Provisional application No. 61/064,977, filed on Apr. 7, 2008.

(51) Int. Cl.
*H04L 12/26* (2006.01)
*H04B 7/00* (2006.01)
*H04L 12/54* (2013.01)

(52) U.S. Cl.
USPC ............ 370/236; 370/252; 370/310; 370/429

(58) Field of Classification Search
USPC ......... 370/229, 230, 232, 235, 236, 310, 351, 370/389, 412, 428, 429
See application file for complete search history.

(56) References Cited

U.S. PATENT DOCUMENTS

| 5,045,861 A | 9/1991 | Duffett-Smith |
| 5,524,136 A | 6/1996 | Barnoy et al. |
| 5,564,079 A | 10/1996 | Olsson |

(Continued)

FOREIGN PATENT DOCUMENTS

| AU | 200066612 B2 | 10/2000 |
| DE | 29919376 U1 | 2/2000 |

(Continued)

OTHER PUBLICATIONS

International Search Report for PCT/AU2009/000436 dated Jun. 1, 2009.

(Continued)

*Primary Examiner* — Omar Ghowrwal
(74) *Attorney, Agent, or Firm* — Dovas Law, P.C.

(57) ABSTRACT

Systems, methods, and processor-readable storage media are disclosed for collecting information pertaining to the configuration of one or more wireless networks and using this information in turn to estimate the location of mobile wireless devices associated with those networks. Certain embodiments of the present disclosure are directed to providing efficient systems and methods for collecting the information, which are responsive to the coverage or quality of the wireless network configuration information already stored in a network database.

13 Claims, 23 Drawing Sheets

(56) References Cited

U.S. PATENT DOCUMENTS

| | | |
|---|---|---|
| 5,666,651 A | 9/1997 | Wang |
| 5,905,953 A | 5/1999 | Liu et al. |
| 5,950,125 A | 9/1999 | Buhrmann et al. |
| 5,969,679 A | 10/1999 | Bolliger |
| 5,999,126 A | 12/1999 | Ito |
| 6,041,236 A | 3/2000 | Bernardin et al. |
| 6,052,064 A | 4/2000 | Budnik et al. |
| 6,061,021 A | 5/2000 | Zibell |
| 6,073,089 A | 6/2000 | Baker et al. |
| 6,088,598 A | 7/2000 | Marsolais |
| 6,097,939 A | 8/2000 | Jacobs |
| 6,104,344 A | 8/2000 | Wax et al. |
| 6,167,265 A | 12/2000 | Kim et al. |
| 6,185,422 B1 | 2/2001 | Mattila |
| 6,201,499 B1 | 3/2001 | Hawkes et al. |
| 6,205,326 B1 | 3/2001 | Tell et al. |
| 6,263,208 B1 | 7/2001 | Chang et al. |
| 6,266,534 B1 | 7/2001 | Raith et al. |
| 6,269,246 B1 | 7/2001 | Rao et al. |
| 6,327,474 B1 | 12/2001 | Ruutu et al. |
| 6,330,600 B1 | 12/2001 | Matchefts et al. |
| 6,356,763 B1 | 3/2002 | Kangas et al. |
| 6,360,094 B1 | 3/2002 | Satarasinghe |
| 6,393,294 B1 | 5/2002 | Perez-Breva et al. |
| 6,411,819 B1 | 6/2002 | Gutowski |
| 6,449,257 B1 | 9/2002 | Choi |
| 6,449,486 B1 | 9/2002 | Rao |
| 6,496,701 B1 | 12/2002 | Chen et al. |
| 6,529,165 B1 | 3/2003 | Duffett-Smith et al. |
| 6,556,842 B1 | 4/2003 | Ericsson |
| 6,560,442 B1 | 5/2003 | Yost et al. |
| 6,567,381 B1 | 5/2003 | Jeon et al. |
| 6,584,314 B1 | 6/2003 | Haumont et al. |
| 6,591,116 B1 | 7/2003 | Laurila et al. |
| 6,631,262 B1 | 10/2003 | Wee |
| 6,711,404 B1 | 3/2004 | Arpee et al. |
| 6,728,539 B2 | 4/2004 | Kuwahara |
| 6,748,224 B1 | 6/2004 | Chen et al. |
| 6,782,265 B2 | 8/2004 | Perez-Breva et al. |
| 6,799,046 B1 | 9/2004 | Tang |
| 6,834,180 B1 | 12/2004 | Marshall |
| 6,856,805 B1 | 2/2005 | Raaf |
| 6,859,654 B1 | 2/2005 | Reynolds et al. |
| 6,947,734 B1 | 9/2005 | Toubassi |
| 6,947,835 B2 | 9/2005 | Kaplan et al. |
| 6,950,664 B2 | 9/2005 | Chen et al. |
| 6,961,587 B1 | 11/2005 | Vilppula et al. |
| 7,031,722 B2 | 4/2006 | Naghian |
| 7,079,850 B2 | 7/2006 | Cameron |
| 7,096,115 B1 | 8/2006 | Groth et al. |
| 7,158,790 B1 | 1/2007 | Elliott |
| 7,158,798 B2 | 1/2007 | Lee et al. |
| 7,233,800 B2 | 6/2007 | Laroia et al. |
| 7,289,763 B2 | 10/2007 | Dennison et al. |
| 7,505,433 B2 | 3/2009 | Yaqub et al. |
| 7,668,832 B2 | 2/2010 | Yeh et al. |
| 7,697,920 B1 | 4/2010 | McClain |
| 7,751,827 B2 | 7/2010 | Poykko et al. |
| 7,835,301 B1 * | 11/2010 | Maufer ......................... 370/254 |
| 2001/0022558 A1 | 9/2001 | Karr et al. |
| 2002/0042268 A1 | 4/2002 | Cotanis |
| 2002/0042269 A1 | 4/2002 | Cotanis |
| 2002/0101834 A1 | 8/2002 | Stanley |
| 2002/0111772 A1 | 8/2002 | Skidmore et al. |
| 2002/0128019 A1 | 9/2002 | Ben-Yair et al. |
| 2002/0164997 A1 | 11/2002 | Parry |
| 2002/0168989 A1 | 11/2002 | Dooley et al. |
| 2002/0173275 A1 | 11/2002 | Coutant |
| 2002/0193150 A1 | 12/2002 | Pritchard |
| 2003/0008668 A1 | 1/2003 | Perez-Breva et al. |
| 2003/0032404 A1 | 2/2003 | Wager et al. |
| 2003/0040318 A1 | 2/2003 | Fattouche |
| 2003/0043941 A1 | 3/2003 | Johnson et al. |
| 2003/0060214 A1 | 3/2003 | Hendrey et al. |
| 2003/0078042 A1 | 4/2003 | Miriyala et al. |
| 2003/0078055 A1 | 4/2003 | Smith et al. |
| 2003/0109274 A1 | 6/2003 | Budka et al. |
| 2003/0119501 A1 | 6/2003 | Kim |
| 2003/0125031 A1 | 7/2003 | Sung Lim et al. |
| 2003/0125045 A1 | 7/2003 | Riley et al. |
| 2003/0147362 A1 | 8/2003 | Dick et al. |
| 2003/0148771 A1 | 8/2003 | de Verteuil |
| 2003/0186710 A1 | 10/2003 | Muhonen et al. |
| 2003/0190916 A1 | 10/2003 | Celedon et al. |
| 2003/0208589 A1 | 11/2003 | Yamamoto |
| 2004/0018835 A1 | 1/2004 | Myers et al. |
| 2004/0037258 A1 | 2/2004 | Scherzer et al. |
| 2004/0116111 A1 | 6/2004 | Saunders |
| 2004/0132464 A1 | 7/2004 | Poykko et al. |
| 2004/0152470 A1 | 8/2004 | Spain |
| 2004/0157621 A1 | 8/2004 | Yamasaki et al. |
| 2004/0160365 A1 | 8/2004 | Riley et al. |
| 2004/0185822 A1 | 9/2004 | Tealdi et al. |
| 2004/0199398 A1 | 10/2004 | Kubota |
| 2004/0203717 A1 | 10/2004 | Wingrowicz |
| 2004/0203880 A1 | 10/2004 | Riley |
| 2004/0203885 A1 | 10/2004 | Quaid |
| 2004/0225681 A1 | 11/2004 | Chaney et al. |
| 2004/0236547 A1 | 11/2004 | Rappaport et al. |
| 2004/0248589 A1 | 12/2004 | Gwon et al. |
| 2004/0259555 A1 | 12/2004 | Rappaport et al. |
| 2005/0012613 A1 | 1/2005 | Eckstein et al. |
| 2005/0040968 A1 | 2/2005 | Damarla et al. |
| 2005/0044564 A1 | 2/2005 | Stopniewicz et al. |
| 2005/0066325 A1 | 3/2005 | Mori et al. |
| 2005/0113117 A1 | 5/2005 | Bolin et al. |
| 2005/0134696 A1 | 6/2005 | Nath et al. |
| 2005/0136938 A1 | 6/2005 | Kang |
| 2005/0169183 A1 | 8/2005 | Lakkakorpi |
| 2005/0192031 A1 | 9/2005 | Vare |
| 2005/0202821 A1 | 9/2005 | Pischella |
| 2005/0210342 A1 | 9/2005 | Schwagmann |
| 2005/0227683 A1 | 10/2005 | Draluk et al. |
| 2005/0239478 A1 | 10/2005 | Spirito |
| 2005/0282540 A1 | 12/2005 | Motamedi et al. |
| 2005/0282544 A1 | 12/2005 | Oommen et al. |
| 2005/0283540 A1 | 12/2005 | Fux et al. |
| 2006/0019665 A1 | 1/2006 | Aghvami et al. |
| 2006/0019679 A1 | 1/2006 | Rappaport et al. |
| 2006/0025068 A1 | 2/2006 | Regan et al. |
| 2006/0025158 A1 | 2/2006 | Leblanc et al. |
| 2006/0052057 A1 | 3/2006 | Persson et al. |
| 2006/0064346 A1 | 3/2006 | Steenstra et al. |
| 2006/0087425 A1 | 4/2006 | Haeberlen |
| 2006/0205417 A1 | 9/2006 | Ju et al. |
| 2006/0221901 A1 | 10/2006 | Yaqub et al. |
| 2006/0227045 A1 | 10/2006 | Sheynblat |
| 2006/0229090 A1 * | 10/2006 | LaDue .......................... 455/507 |
| 2006/0234701 A1 | 10/2006 | Wang et al. |
| 2006/0270421 A1 | 11/2006 | Phillips et al. |
| 2007/0001808 A1 | 1/2007 | Kastelic et al. |
| 2007/0001867 A1 | 1/2007 | Rowe et al. |
| 2007/0087764 A1 | 4/2007 | Buckley et al. |
| 2007/0121520 A1 | 5/2007 | Shrikhande et al. |
| 2007/0123268 A1 | 5/2007 | Parata |
| 2007/0208495 A1 | 9/2007 | Chapman et al. |
| 2007/0232319 A1 | 10/2007 | Bells et al. |
| 2007/0259670 A1 | 11/2007 | Sakhpara |
| 2007/0270168 A1 | 11/2007 | Sheynblat |
| 2007/0297346 A1 | 12/2007 | Huisman et al. |
| 2008/0004037 A1 | 1/2008 | Achlioptas et al. |
| 2008/0030345 A1 | 2/2008 | Austin et al. |
| 2008/0061967 A1 | 3/2008 | Corrado |
| 2008/0144082 A1 * | 6/2008 | Kister ............................ 358/1.15 |
| 2008/0194235 A1 * | 8/2008 | Dalsgaard et al. ............. 455/411 |
| 2009/0160939 A1 | 6/2009 | Fernandez et al. |
| 2009/0182630 A1 | 7/2009 | Otto et al. |
| 2009/0294538 A1 | 12/2009 | Wihlborg et al. |
| 2010/0167725 A1 | 7/2010 | Noldus et al. |
| 2011/0244919 A1 | 10/2011 | Aller et al. |
| 2012/0253668 A1 | 10/2012 | Sheha et al. |

(56) References Cited

U.S. PATENT DOCUMENTS

FOREIGN PATENT DOCUMENTS

| | | |
|---|---|---|
| DE | WO 2007/115777 A1 | 10/2007 |
| EP | 0431956 A2 | 7/1990 |
| EP | 0874248 A2 | 10/1998 |
| EP | 0936758 A2 | 8/1999 |
| EP | 0982964 A2 | 3/2000 |
| EP | 1030531 A1 | 8/2000 |
| EP | 1120632 B1 | 8/2001 |
| EP | 1175115 A2 | 1/2002 |
| EP | 1235076 A1 | 8/2002 |
| EP | 1271101 A2 | 1/2003 |
| EP | 1304897 A1 | 4/2003 |
| EP | 0767594 B1 | 11/2003 |
| EP | 1677562 A1 | 7/2006 |
| EP | 1137305 B1 | 1/2008 |
| EP | 2083576 A1 | 7/2009 |
| GB | 2352134 A | 1/2001 |
| GB | 2358500 A | 7/2001 |
| GB | 2364617 A | 1/2002 |
| JP | 07-255079 A | 10/1995 |
| JP | 08-265824 A | 10/1996 |
| JP | 2001-330657 A | 11/2001 |
| JP | 2004-104349 A | 4/2004 |
| WO | WO 92/02105 A1 | 2/1992 |
| WO | WO 93/15569 | 8/1993 |
| WO | WO 95/35636 A1 | 12/1995 |
| WO | WO 97/11384 A | 3/1997 |
| WO | WO 98/12885 A2 | 3/1998 |
| WO | WO 98/48578 A2 | 10/1998 |
| WO | WO 9843450 | 10/1998 |
| WO | WO 99/13662 A | 3/1999 |
| WO | WO 00/18148 A | 3/2000 |
| WO | WO 00/28755 A1 | 5/2000 |
| WO | WO 0049826 | 8/2000 |
| WO | WO 01/03372 A | 1/2001 |
| WO | WO 01/37601 | 5/2001 |
| WO | WO 01/99082 A2 | 12/2001 |
| WO | WO 02/47421 | 12/2001 |
| WO | WO 0195592 | 12/2001 |
| WO | WO 02/073997 A1 | 9/2002 |
| WO | WO 02/082850 | 10/2002 |
| WO | WO 03/087869 | 10/2003 |
| WO | WO 2004034721 | 4/2004 |
| WO | WO 2004/047315 A2 | 6/2004 |
| WO | WO 2004/079478 A2 | 9/2004 |
| WO | WO 2004/080105 A2 | 9/2004 |
| WO | WO 2004/084022 A2 | 9/2004 |
| WO | WO 2005/009020 A1 | 1/2005 |
| WO | WO 2005/109695 A1 | 11/2005 |
| WO | WO 2006/026816 A2 | 3/2006 |
| WO | WO 2006/053835 A1 | 5/2006 |
| WO | WO 2006/059188 A1 | 6/2006 |
| WO | WO 2006087438 A1 | 8/2006 |
| WO | WO 2006/096922 A1 | 9/2006 |
| WO | WO 2006/096923 A1 | 9/2006 |
| WO | WO 2006/105618 A1 | 10/2006 |
| WO | WO 2006/105619 A1 | 10/2006 |
| WO | WO 2006/112561 | 10/2006 |
| WO | WO 2006/125085 | 11/2006 |
| WO | WO 2007/017691 A1 | 2/2007 |
| WO | WO 2007/020635 A2 | 2/2007 |
| WO | WO 2007/040320 A1 | 4/2007 |
| WO | WO 2007040320 | 4/2007 |
| WO | WO 2007/048176 | 5/2007 |
| WO | WO 2007/048177 | 5/2007 |
| WO | WO 2007/051223 A1 | 5/2007 |
| WO | WO 2007/071271 A1 | 6/2007 |
| WO | WO 2007/102816 A1 | 9/2007 |
| WO | WO 2008/055302 | 5/2008 |
| WO | WO 2008/059570 | 5/2008 |
| WO | WO 2008/109948 A1 | 9/2008 |
| WO | WO 2009/036497 | 3/2009 |
| WO | WO 2009/067766 | 6/2009 |
| WO | WO 2009080105 | 7/2009 |
| WO | WO 2009/124348 | 10/2009 |
| WO | WO 2009/124349 | 10/2009 |
| WO | WO 2010/022470 | 3/2010 |
| WO | WO 2010090558 | 8/2010 |

OTHER PUBLICATIONS

Mir et. al, "A Zone-Based Location Service for Mobile Ad Hoc Networks", 1NCC 2004, Jun. 2004.

3GPP TR05.08, "Radio Subsystem Link Control", Nov. 2005.

Specification 3GPP TS 03.22, "Radio Access Network; Functions Related to Mobile Station(MS) in Idle Mode and Group Receive Mode", 1999.

Specification 3GPP TS 23.048, "Technical Specification Group Core Network and Terminals; Security Mechanisms for the (U)SIM Application Toolkit", 2005-2006.

Specification 3GPP TS 25.304 "User Equipment (UE) Procedures in Idle Mode and Procedures for Cell Reselection in Connected Mode", 2011.

International Search Report of PCT/AU2006/001577 dated Nov. 28, 2006.

M. Hata, "Empirical formula for propagation loss in land mobile radio services" IEEE Transactions on Vehicular Technology, vol. VT-29, pp. 317-325, Aug. 1980.

T. Roos, P. Myllymaki, and H. Tirri, "A statistical modeling approach to location estimation," IEEE Transactions on Mobile Computing vol. 1, pp. 59-69, Jan. 2002.

T. Halonen, J. Romero and J. Melero, GSM, GPRS and EDGE Performance; Evolution Towards SG/UMTS. John Wiley and Sons, 2nd ed., 2003.

L.M. Correia, Wireless Flexible Personalized Communications: COST 259 European Co-Operation in Mobile Radio Research. Wiley 2001.

IEEE Vehicular Technology Society Committee on Radio Propagation Coverage Prediction for Mobile Radio Systems Operating in the 800/900 MHz frequency range IEEE Transactions on Vehicular Technology: Special Issue on Mobile Radio Propagation, vol. 37, pp. 3-72, Feb. 1988.

3rd Generation Partnership Program, "3GPP TR 25.942 Radio Frequency (RF) System Scenarios," tech. rep., 3GPP, 2004.

Schwartz et al., "On the Distribution and Moments of Power Sums with Logonormal Components", Bell Sys. Tech, J., vol. 61, No. 7, pp. 1441-1463, Jul. 20 , 1981.

Balis P. G. et al. "UTD-Based Model for Prediction of Propagation Path Loss and Shadowing Variability in Urban Mobile Environments" IEE Proceedings: Microwaves, Antennas and Propagation, IEE, Stevenage, Herts, GB, vol. 144 No. 5 Oct. 9, 1997, pp. 367-371 XP006008788 ISSN: 1350-2417.

W.C.Y. Lee, Mobile Communications Engineering. McGraw-Hill, 1982.

Bernardin et al., "Cell Radius Inaccuracy: A New Measure of Coverage Reliability", IEEE Transactions on Vehicular Technology, vol. 47, No. 4, Nov. 1998.

W.H. Press S. A. Teukolsky, W.T. Vetterling & B.P. Flannery, "Numerical Recipes in C++; The Art of Scientific Computing", 2nd Ed, Feb. 2002, Cambridge University Press.

C.R. Drane, Positioning Systems—A Unified Approach, Lecture Notes in Control and Infromation Sciences, Springer Verlag, Oct. 1992.

P.L.H.A.S. Fischer, "Evaluation of Positioning Measurement Systems," T1P1.5/97-110, Dec. 1997.

A.M. Zoubir and B. Boobash, "The Bootstrap and Its Application in Signal Processing," IEEE Signal Processing Magazine, 15(1):56-76, Jan. 1998.

Martin Hellenbrandt, Rudolf Mathar and Scheibenbogen Markus, "Estimating Position and Velocity of Mobiles in a Cellular Radio Network," IEEE Transactions on Vehicular Technology, 46(1): 65-71, Feb. 1997.

Section 2.7 of Mobile Radio Communications 2nd Ed. Steele and Hanzo, IBSN 047197806X,J. Wiley & Sons Ltd., 1999.

B. Matsumori T1P1.5/98-600 "Radio Camera System and Location Fingerprinting Technology", Presentation Submission to Location Standards Working Group T1P1.5 by U.S. Wireless 1998.

(56) References Cited

OTHER PUBLICATIONS

Annex I of GSM 05.05 "Digital cellular Telecommunication System (Phase 2)", Radio Transmission and Reception, 2001.
S.R. Saunders & A. Aragon-Zavala, Antennas and Propagation for Wireless Communications Systems: 2nd Ed., Wiley 2007.
Doru-Petru Munteanu, Onoriu Bradeanu, Petrica Ciotirnae, Constantin-Julian Vizitiu: "Zone Profile Generation for Location Based Services and Traffic Analysis", 12th WSEAS International Conference on Communications, Heraklion, Greece, Jul. 23-25, 2008, pp. 386-390.
Specification 3GPP TS 31.111-Sections 6.4, 6.616, 6.6.21 and 6.6.22, Oct. 2010.
"Computational Geometry in C (Cambridge Tracts in Theoretical Computer Science)", Joseph O'Rourke, Cambridge University Press; 2000 edition, ISBN 0521649765.
European Search Report dated Nov. 4, 2010 for EP 08714391.3.
International Search Report dated Sep. 20, 2004 for PCT/AU2004/000983.
European Search Report dated Mar. 15, 2007 for EP 04737602.5.
International Search Report dated Dec. 5, 2005 for PCT/AU2005/001358.
International Search Report dated May 7, 2008 for PCT/AU2008/000344.
International Search Report dated Apr. 26, 2006 for PCT/AU2006/000347.
International Search Report dated Apr. 26, 2006 for PCT/AU2006/000348.
European Search Report dated Feb. 19, 2010 for EP 06721361.1.
International Search Report dated May 31, 2006 for PCT/AU2006/000479.
International Search Report dated Jun. 29, 2006 for PCT/AU2006/000478.
European Search Report dated Dec. 22, 2009 for EP 06721360.3.
European Search Report dated Jul. 23, 2010 for EP 06705018.7.
International Search Report dated Jan. 24, 2007 for PCT/AU2006/001479.
International Search Report dated Dec. 19, 2006 for PCT/AU2006/001576.
International Search Report dated Feb. 19, 2008 for PCT/AU2007/001706.
International Search Report dated Nov. 24, 2008 for PCT/AU2008/001374.
International Search Report dated Jan. 15, 2009 for PCT/AU2008/001783.
Oma Download Architecture-Version 1.0, Jun. 25, 2004.
International Search Report dated Nov. 25, 2009 for PCT/AU2009/001123.
International Search Report dated May 11, 2009 for PCT/AU2009/000438.
European Search Report dated Feb. 19 2009 for EP 06705017.9.
3GPP-TR-23.806, "Voice Call Continuity Between CA and MS Study", tech. rep. 3GPP, 2005.
International Search Report dated Nov. 3, 2011 for PCTAU2011/001038.
European Search Report dated Mar. 2, 2012 for European Patent Application 09729670.1.
European Search Report dated Feb. 24, 2012 for European Patent Application 09729862.4.
European Search Report dated Feb. 22, 2012 for European Patent Application 08714391.3.
European Search Report dated Mar. 12, 2012 for European Patent Application 06790414.4.
European Search Report dated Mar. 9, 2012 for European Patent Application 08800009.6.
European Search Report dated Mar. 12, 2012 for European Patent Application 06804431.2.
European Search report dated Jul. 25, 2012 for European Patent Application 06790349.2.
Schwartz et al., "On the Distribution and Moments of Power Sums with Logonormal Components", Bell Sys. Tech, J., vol. 61, No. 7, pp. 1441-1463, Jul. 20, 1981.
Office Action dated Nov. 17, 2011 for U.S. Appl. No. 12/736,430.
Office Action dated May 24, 2012 for U.S. Appl. No. 12/736,430.
Office Action dated Mar. 28, 2013 for U.S. Appl. No. 12/736,430.
Office Action dated Oct. 10, 2013 for U.S. Appl. No. 12/736,430.

\* cited by examiner

EFFICIENT COLLECTION OF WIRELESS TRANSMITTER CHARACTERISTICS

CROSS-REFERENCE TO RELATED APPLICATIONS

This application is the U.S. National Phase application of International Application No. PCT/AU2009/000436, filed 7 Apr. 2009, which designates the United States and was published in English, which in turn claims priority from U.S. Provisional Patent Application No. 61/064,977, filed on 7 Apr. 2008. The foregoing applications, in their entirety, are hereby incorporated by reference.

The present application is related to the following co-pending patent applications: PCT/AU2006/000479 entitled Mobile Location; PCT/AU2006/000348 entitled Enhanced Mobile Location; PCT/AU2006/000347 entitled Enhanced Mobile Location Method and System; PCT/AU2006/000478 entitled Enhanced Terrestrial Mobile Location; PCT/AU2008/000344 entitled Enhanced Zone Determination, filed Mar. 13, 2008 claiming priority from U.S. Provisional Application Ser. No. 60/906,526; PCT/AU2006/001577 entitled Detection in Mobile Service Maintenance; PCT/AU2006/001576 entitled Mobile Service Maintenance Management; U.S. Provisional Application Ser. No. 61/064,977 entitled Location of wireless mobile terminals, filed Apr. 7, 2008 from which the present PCT application claims priority; and PCT/AU2009/000438 entitled Location of wireless mobile terminals filed concurrent with the present PCT. The entire content of each of these applications is hereby incorporated by reference. Furthermore, the entire contents of the following references is hereby incorporated by reference. W. C. Y. Lee, *Mobile Communications Engineering*, McGraw-Hill, 1982, and P. L. H. A. S. Fischer, "Evaluation of positioning measurement systems", T1P1.5/97-110, December 1997, and IEEE VTS committee, "Coverage prediction for mobile radio systems operating in the 800/900 MHz frequency range", IEEE Transactions on VTC, Vol. 37, No. 1, February 1998, 3GPP TS 05.08, and C. R. Drane, *Positioning Systems, a Unified Approach*, Springer Verlag, 1992, S. R. Saunders & A. Aragon-Zavala, *Antennas And Propagation For Wireless Communication Systems*: 2nd Ed, Wiley, 2007.

FIELD

Certain embodiments of the present disclosure are directed to providing systems, methods and devices for collecting information pertaining to the configuration of one or more wireless networks and using this information in turn to estimate the location of mobile wireless devices associated with those networks. Certain embodiments of the present disclosure are directed to providing efficient systems and methods for collecting the information, which are responsive to the coverage or quality of the wireless network configuration information already held.

BACKGROUND

The role of location determination in wireless mobile communication systems is gaining importance, with services such as navigation, search, proximity, safety & security all depending on it. In certain types of wireless location systems, the location of a mobile device is measured with respect to one or more fixed transmitter sites whose locations are known. The location determination algorithms in such systems may also take into account other parameters where available, describing the configuration of the transmitters including antenna parameters, orientation and transmit power levels.

In certain cases the information on the configuration of the transmitters may already be held by the service provider and therefore available for use in the location determination system. For example the service provider may be a cellular network operator. In this case, details on the configuration of the radio access network is typically maintained by a radio network planning department within the operator.

In other cases however, a provider of location based mobile services may not have certain information concerning the configuration of the access networks through which users access a service. In order to obtain location information for use in the offered services, certain providers of such mobile location based services have developed systems and methods in attempts to obtain the wireless transmitter configuration information using dedicated survey measurements. Other service providers have developed systems and methods for collecting wireless transmitter characteristics in an opportunistic fashion as subscribers utilize the service. For example, subscribers having a GPS handset and accessing the service may contribute one or more measurements of a transmitter accompanied by a GPS position fix. In certain cases both survey measurements as well as opportunistic measurements may be combined.

Notwithstanding these methods of obtaining the transmitter configuration information, several limitations remain with the provision of mobile location based services where information on the configuration of the radio network is sought. One limitation is due to changes in the configuration of such networks from time to time. Existing systems are commonly slow to account for changes in the configuration of the radio network. For example it has been observed with one publicly available mobile mapping service that a change in the configuration of some UMTS cells in a region of London resulted in a substantial loss of coverage for a period lasting at least 12 days. This was despite repeated requests from handsets with a GPS activated, in an attempt to "seed" the cell database. For users of such systems it may be useful to have continuous service and therefore desirable that the location determination system can detect and respond to changes in the wireless network promptly, thereby maintaining the quality of the location service. One reason that existing systems cannot respond to changes in the wireless network configuration promptly is that the configuration information is mainly collected through costly and time consuming manual surveys or "war driving" of the networks. Such data may in some cases also be augmented with other data collected opportunistically when for instance a user requests a map on a cellular device while having an inbuilt GPS enabled. In this case, the mapping application may also collect information on the current serving cell and report this along with the current GPS coordinates to a server. With either or both of these strategies for data collection in use, there remains the issue that changes in a particular location may take a considerable time to recover, either by waiting until the next drive test in that location or by waiting for a cooperative user to enable a GPS on their terminal and initiate one or measurements from the affected region.

A further limitation of existing systems is that it is commonly necessary with such systems to repeat network surveys periodically to refresh the network configuration database to reflect changes since the previous survey which have not been detected through the opportunistic collection of measurements. From a commercial perspective this can represent a significant burden to providers of services based on such a database.

The limitations described in the previous paragraphs and other limitations can be overcome using systems, methods and/or devices which can more rapidly and efficiently collect wireless network configuration information and can be operated to respond to changes in the network configuration more rapidly than existing systems, methods and/or devices thereby enhancing the accuracy and coverage of the wireless configuration database and preserving a better level of service for users of location systems utilizing the database. For the foregoing reasons, there is a need for systems, methods and devices which can collect the measurements needed to characterize the transmitters in a wireless network, more efficiently and more rapidly. There is also a need for systems, methods and/or devices that are responsive to the current quality or coverage of the wireless network transmitter database and which can accelerate the collection rate at times when there is a greater need for measurement information and furthermore can focus the measurements on regions of the network where the database coverage is less accurate or complete. There is also a need for systems, methods and devices that are scalable as the services supported by such systems may be offered across many networks in many markets to many millions of subscribers For providers of location based services using an independently acquired database of wireless transmitter characteristics there is another challenge with existing systems, namely that all of or at least a substantial proportion of the geographical area to be served must be covered by the transmitter database before a service can be successfully offered. With existing systems, either the service provider must invest in a costly surveying exercise before launching the service or else must rely on opportunistic measurements from early users who are willing to tolerate poor service in some instances or else some combination of both to achieve a sufficient level of coverage. There is therefore further need for systems, methods and devices which can more efficiently collect the required transmitter information and can accelerate the acquisition process in the early stages of a service when user populations are smaller and the coverage of the transmitter database may be incomplete.

SUMMARY

Certain embodiments of the present disclosure provide methods, systems, and processor-readable media to collect and maintain a repository of wireless network configuration information. Certain embodiments also use this repository to offer a facility for applications to determine the location of a cellular device regardless of the country in which it is situated or the carrier it is registered with or the radio access technology in use.

In certain embodiments, methods, systems, and processor-readable media in accordance with the present disclosure are characterized by the steps of retrieving from a database a list indicating a current state of information in the database regarding one or more wireless transmitters in the wireless network, wherein the list includes one or more transmitter identifiers, and zero or more parameters associated with each transmitter identifier; communicating the list to at least one device having one or more wireless receivers; and receiving a selected sequence of one or more radio measurements from a device having one or more wireless receivers, wherein the device selects the sequence by assigning a priority to sequences of one or more radio measurements based on the list of one or more transmitter identifiers and selecting at least one sequence of at least one of the one or more radio measurements based on the assigned priority.

In further embodiments, methods, systems, and processor-readable media in accordance with the present disclosure are characterized by the steps of retrieving from a database a list indicating a current state of information in the database regarding one or more wireless transmitters in the wireless network; communicating the list to at least one device having one or more wireless receivers; receiving from a device containing one or more wireless receivers a selected subset of one or more radio measurements obtained by the device; and estimating or updating a set of characteristics of at least one wireless transmitter based at least in part on the selected subset of one or more radio measurements; wherein the selection process of the device reduces traffic on a wireless network, reduces processing for a given increment in a quality of information in the database, improves updating of the database by reducing an amount of data transmitted, reduces an amount of server processing, and/or improves coverage of the database.

In still further embodiments, methods, systems, and processor-readable media in accordance with the present disclosure are characterized by the steps of retrieving from a database a list indicating a current state of information in the database regarding one or more wireless transmitters in the wireless network; communicating the list from a server to at least one device having one or more wireless receivers; receiving at the server from a device having one or more wireless receivers a selected subset of one or more radio measurements obtained by the device, wherein the device selects the subset of one or more measurements based on the list; and updating the list indicating the current state of the information in the database.

In still further embodiments, methods, systems, and processor-readable media in accordance with the present disclosure are characterized by the steps of retrieving from a database a list indicating a current state of information in the database regarding one or more wireless transmitters in the wireless network, wherein the list includes an associated version number indicating a current revision of the list; communicating the list from a server to at least one mobile radio terminal; receiving at the server from a mobile radio terminal a selected subset of one or more radio measurements obtained by the mobile radio terminal, wherein the selection process of the mobile radio terminal improves updating of the database by reducing an amount of data transmitted, reduces an amount of server processing, and/or improves coverage of the database; estimating or updating at the server a set of characteristics of at least one wireless transmitter based on the selected subset of one or more radio measurements; and if the server determines that substantial changes have occurred in the wireless network based on the set of characteristics, updating the list to accelerate reporting by mobile radio terminals in an affected region.

In yet further embodiments, methods, systems, and processor-readable media in accordance with the present disclosure are characterized by the steps of obtaining in a device containing one or more wireless receivers and a GPS receiver, one or more radio measurements corresponding to at least one wireless transmitter; selecting the one or more radio measurements for reporting to a server together with GPS position information when a GPS position fix becomes available, and reporting the selected measurements and GPS information to a server wherein the one or more radio measurements and GPS position fix are used to update a database of transmitter characteristics.

In yet further embodiments, methods, systems, and processor-readable media in accordance with the present disclosure are characterized by the steps of obtaining in a device having one or more wireless receivers, one or more radio measurements corresponding to at least one wireless transmitter; checking whether a transmitter identifier of the at least one wireless transmitter is present in a list maintained on the device of recently reported transmitter identifiers; and if a transmitter identifier corresponding to the at least one wireless transmitter is not present in a list maintained on the device of recently reported transmitter identifiers, then communicating the one or more measurements to a server and adding the transmitter identifier of the at least one wireless transmitter to the list; wherein the one or more radio measurements are used to update a database of transmitter characteristics.

In further embodiments, methods, systems, and processor-readable media in accordance with the present disclosure are characterized by the steps of obtaining in a device having one or more wireless receivers, one or more radio measurements corresponding to at least one wireless transmitter; determining whether the one or more radio measurements are eligible for reporting based on a gating function; and if the one or more radio measurements are eligible for reporting, then communicating the measurements to a server, wherein the one or more radio measurements are used to update a database of transmitter characteristics.

In still further embodiments, methods, systems, and processor-readable media in accordance with the present disclosure are characterized by the steps of receiving at a device having one or more wireless receivers a list indicating a current state of information in a database regarding one or more wireless transmitters in a wireless network; obtaining one or more radio measurements from wireless transmitters in the wireless network; selecting a subset of the one or more radio measurements for reporting based on the list; and communicating to the server the selected subset of one or more radio measurements.

In still further embodiments, methods, systems, and processor-readable media in accordance with the present disclosure are characterized by the steps receiving a list of tasking information at a mobile radio terminal, wherein the list of tasking information includes a quality of a set of characteristics of a first wireless network transmitter; measuring at the mobile radio terminal at least one radio network parameter from the first wireless network transmitter; if the quality of the set of characteristics for the first wireless network transmitter is below a threshold, generating a report having at least one measurement of at least one radio network parameter from the first wireless network transmitter; and communicating the report to a server.

BRIEF DESCRIPTION OF THE DRAWINGS

These and other features, aspects, and advantages disclosed herein will become better understood with regard to the following description, appended claims, and accompanying drawings where:

DETAILED DESCRIPTION

Figure 1:
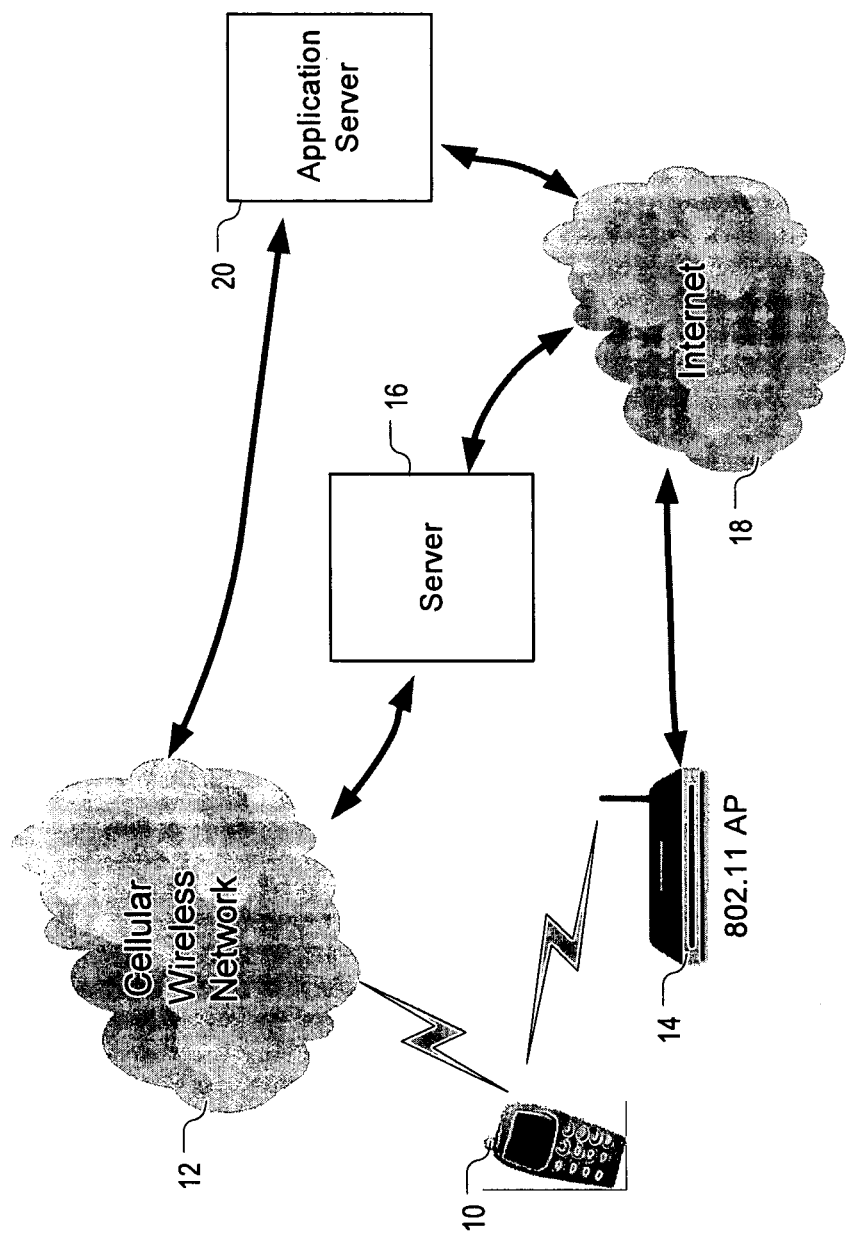
FIG. 1 illustrates an exemplary system architecture in accordance with certain embodiments.

Certain embodiments of the present disclosure will now be described in detail, examples of which are illustrated in the accompanying drawings. The examples and embodiments are provided by way of explanation only and are not to be taken as limiting to the scope of the inventions. Furthermore, features illustrated or described as part of one embodiment may be used with one or more other embodiments to provide a further new combination. It will be understood that the present inventions will cover these variations and embodiments as well as variations and modifications that would be understood by the person skilled in the art.

The terms "transmitter", "wireless network access point" and "cell" are used to refer to a wireless network transceiver that provides access to one or more mobile wireless devices. For example, in a GSM, CDMA and UMTS networks this corresponds to a BTS or base station. In a Wi-Fi network, this corresponds to an Access Point (AP). In a WiMAX network the term base station is also used.

The term "mobile wireless device" is used synonymously with terms such as "mobile radio terminal," "mobile station," "mobile phone," "user equipment," "cell phone," or "handset" and encompasses any kind of mobile radio terminal including Personal Digital Assistants (PDAs), laptop and other mobile computers, and pagers. The mobile wireless device may be any type of handset or PDA and may operate over any radio communications network such as GSM, UMTS, or CDMA. A wireless device typically includes a display, a network transceiver, a central processing unit (CPU), a memory (e.g., SDRAM), a Subscriber Identity Module (SIM) card, a data storage unit, an antenna, and one or more inputs such as a keypad or touch screen. In certain embodiments the handset may include a Wi-Fi transceiver. In certain embodiments the handset may include a GPS transceiver. In certain embodiments, CDMA handsets may include a Removable User Identity Module (R-UIM) and UMTS handsets may include a Universal Subscriber Identity Module (USIM).

The SIM card is a specific instance of a smart card or security/trust token for secure wireless communication networks, i.e., in this instance for the GSM network. Other representative examples of smart cards for secure wireless communication networks include the Universal Identity Module (UIM), the Removable User Identity Module (R-UIM), and the UMTS Subscriber Identity Module (USIM). The SIM represents the subscription contract between a specific subscriber (network user) and the GSM network operator, i.e., providing the means for authenticating the subscriber for network access and identifying GSM network services to which the subscriber is entitled, i.e., the SIM card is the subscriber's identity in the context of the GSM network. The SIM card is portable to any GSM terminal, thereby providing the subscriber with an unprecedented degree of personal mobility.

The SIM card is in fact a small computer, containing a standardized operating system (JavaCard™ is implemented in the SIM card; Smart Card for Windows and Multos™ are other standardized operating systems for smart cards) and system files, RAM and flash memory (for storage of data and applications), a microprocessor, and typically a cryptographic co-processor. The GSM network operator controls the distribution and the stored content, e.g., data, applications, of the SIM card. Content on the SIM card may be provisioned by one or more of the network operator, the handset manufacturer, the SIM card manufacturer, or the subscribers themselves (via, for example, WAP Push, or direct USB download). Stored on SIM cards configured for GSM networks are subscription and security-related data, e.g., a subscriber number (International Mobile Subscriber Identity (IMSI)) that uniquely identifies the subscriber, a network operator-assigned subscriber-specific call number (MSISDN), i.e., the subscriber's 'phone number' in the GSM network, the subscriber key and cryptographic algorithms for authentication of the subscriber and encryption of subscriber communications (specified by the GSM network operator), and subscriber personal data, e.g., the subscriber's password or personal identity number (PIN) for accessing the SIM card, personal telephone directory, call charging information, a log of recently-dialed numbers, short text messages (for use with SMS (Short Message Service)), and a personalized subscriber services portfolio, i.e., applications.

Also embedded in the SIM card is a SIM Application Toolkit (STK). The STK provides the functional capability, inter alia, to allow the subscriber to access and use embedded applications via the user interface of the GSM terminal, and to modify the menu structure of the GSM terminal in conjunction with the use of such applications. The STK also allows the GSM network operator to download new data and/or applications to the SIM card to implement new services for the subscriber.

We use the term client to refer to a software application that is deployed on a mobile wireless device to collect and report measurements to a server. The client functionality could be implemented in a standalone application or integrated as a component of another application. The deployment could be in the form of a Symbian, J2ME, BREW, SIM Toolkit or other application, even embedded in the firmware of the device. Such clients may be pre-installed on the device or offered for download by the user via the internet. Yet another mechanism for the clients to be deployed includes Over The Air (OTA) mechanisms in which either at the user's request or at the service provider's decision the client can be transferred wirelessly onto the subscriber's device. Such mechanisms are described for instance in 3GPP TS 23.048 and also the Open Mobile Alliance OMA Download OTA Specification (OMA-Download-OTA-V1_0-20040625-A). Yet a further implementation option for the client is as a component of either the device firmware or operating system.

As used in this disclosure in accordance with certain embodiments, more efficiently may mean achieving a certain level of coverage with between 1 and 15, 2 and 10, 2 and 8, 3 and 8, 3 and 6 or 2 and 5 times less reports. As used in this disclosure in accordance with certain embodiments, more rapidly may mean achieving a certain level of coverage and/or accuracy in the transmitter database in an interval that is between 1 and 10, 1 and 5, 2 and 5, 1.5 and 4 or 1.5 and 5 times shorter than with existing systems. As used in this disclosure in accordance with certain embodiments, by increasing coverage we mean reducing the number of instances where a user moving about randomly within the coverage area of the network would fail to be located with a position error falling with a defined accuracy range.

In certain embodiments, the client could be a continuously running application which from time to time collects information identifying nearby wireless network transmitters and preferably also reference position information such as from a GPS receiver. Such a client could be installed on a mobile device and conveniently placed in a number of vehicles such as taxis which move about the coverage area of one or more wireless networks collecting measurements as required. In an alternative embodiment, the client functionality could be implemented as part of an application offered to consumer or enterprise subscribers with the result that it is active only intermittently, when the application is launched by the device user. In yet other embodiments, the client functionality could be run as a background process on mobile devices, that is either activated automatically when the device is powered on or is left running when an application hosting the client functionality is deactivated.

In certain embodiments the information or measurements are collected periodically. In other embodiments, information corresponding to different wireless networks may be collected at different rates. For example cellular network information may be collected more frequently than WiFi network information owing to the typically greater impact of WiFi scanning on the battery life of a device.

A processor-readable medium as described herein can be any form of data storage that is accessible by a computer processor. This can include, for example, optical storage, magnetic storage, RAM, flash ROM, ROM, or any other suitable medium.

Figure 3:
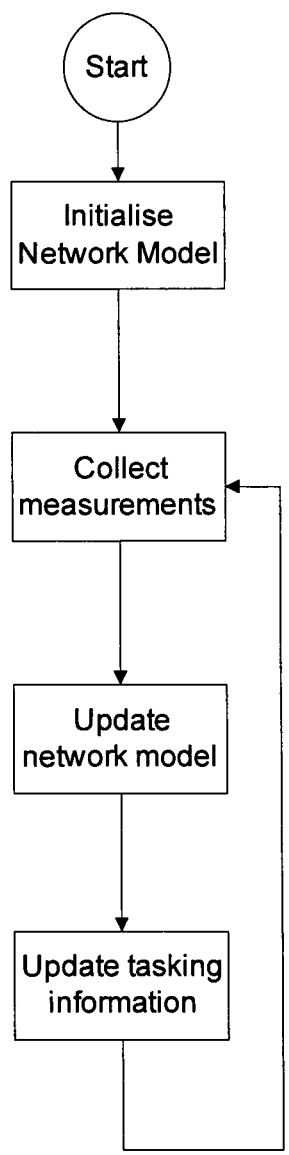
FIG. 3 illustrates an exemplary life cycle for collection of network transmitter characteristics in accordance with certain embodiments.

The following sections describe systems and methods for collecting measurement information to estimate the radio network configuration. FIG. 1 provides an exemplary system architecture in accordance with certain embodiments. A mobile wireless device 10 is shown which may be capable of connecting to either a cellular wireless network 12 or other wireless network 14 (depicted by an Access Point) or both. The device may also include a GPS location capability (either mobile based or mobile assisted). A server 16 is shown which connects to either or both of the cellular or other wireless network. In the latter case the connection between the wireless access layer and the server will usually be via the internet 18. In the exemplary illustration of FIG. 1, the server 16 represents the aspects of the present disclosure that are implemented on the network side. Also shown is an application server 20, which may interact with the server 16 and/or mobile wireless device 10 either to supply information for learning about the radio network configuration or make use of services provided in order to provide other services to wireless device users or other third parties. Examples of such application servers 20 include without limitation, mapping and/or navigation platforms, content search platforms, mobile advertising platforms, voice-over-IP (VOIP) gateways, instant messaging platform and presence servers. FIG. 3 illustrates an exemplary lifecycle for a collection of characteristics corresponding to one or more wireless transmitters in a network.

Figure 2:
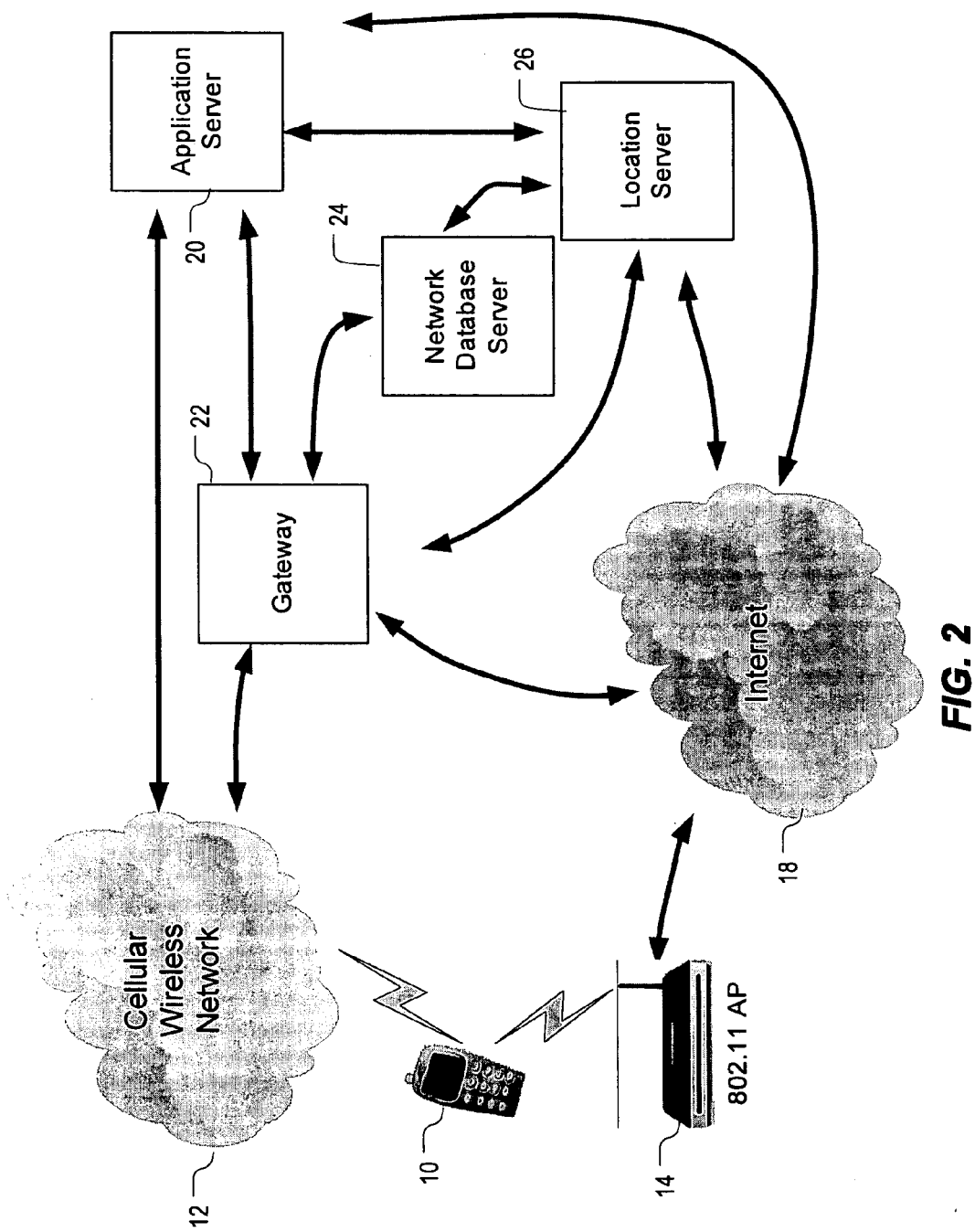
FIG. 2 provides a further illustration of an exemplary system architecture in accordance with certain embodiments.

Additionally, while FIG. 1 illustrates an exemplary a single cellular network and a single access point, in implementation this could be any number of cellular and fixed wireless networks. FIG. 2 illustrates an exemplary configuration but expands the server into three logical components, a gateway 22, network database server 24, and location server 26. In the following description, when referring to one of these specific components we will use these terms. Further details on the operation of each are provided below. It should be noted that while the illustration in FIG. 2 shows a single instance of each, the logical and physical configuration of a practical deployment could feature one or more of each of these elements depending on capacity & scaling requirements as well as IT architecture & security constraints.

Figure 23:
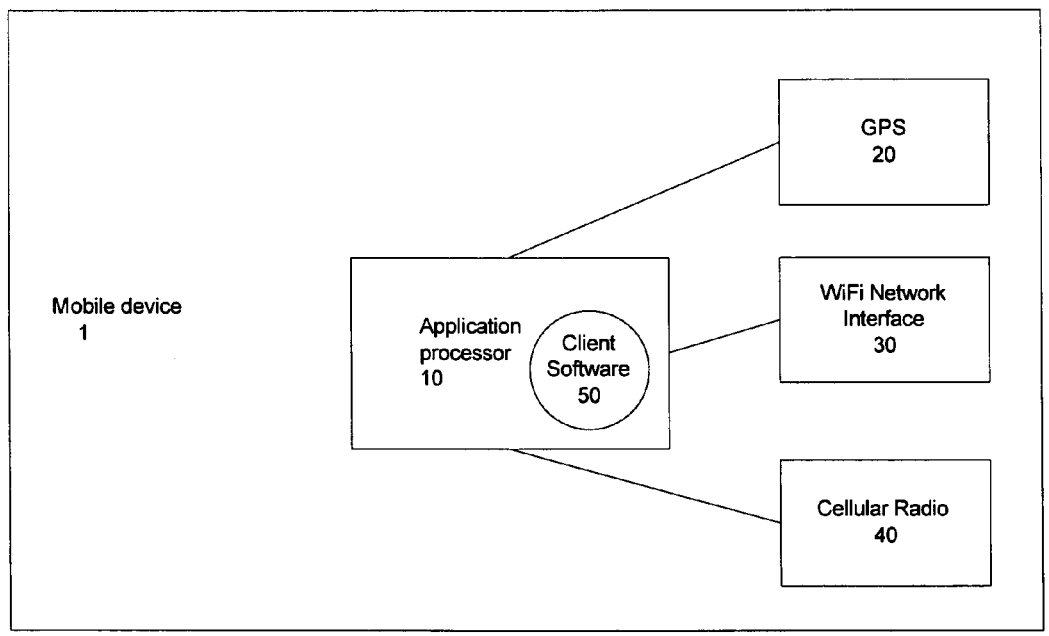
FIG. 23 illustrates an exemplary mobile device in accordance with certain embodiments.

FIG. 23 shows an exemplary mobile device according to certain embodiments, which includes a GPS receiver, 20, a WiFi transceiver, 30, and a cellular transceiver 40. The device also incorporates an application processor, 10 on which client software 50, executes to carry our certain aspects of the present disclosure.

Figure 24:
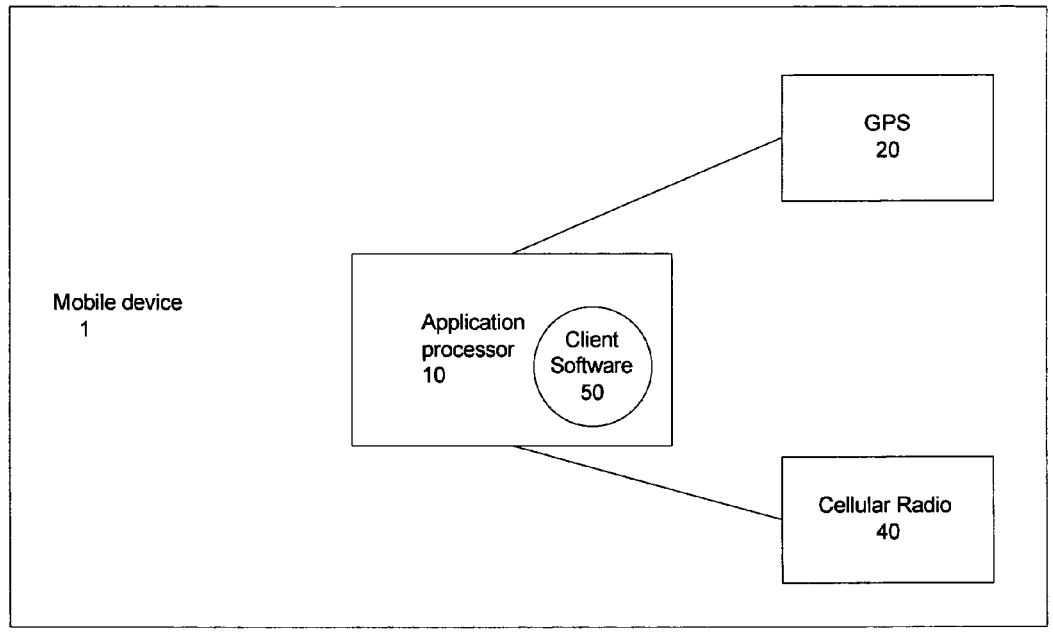
FIG. 24 illustrates an exemplary mobile device in accordance with certain embodiments.

FIG. 24 shows an exemplary mobile device according to certain embodiments, which includes a GPS receiver, 20, and a cellular transceiver 40. The device also incorporates an application processor, 10 on which client software 50, executes to carry our certain aspects of the present disclosure.

Figure 25:
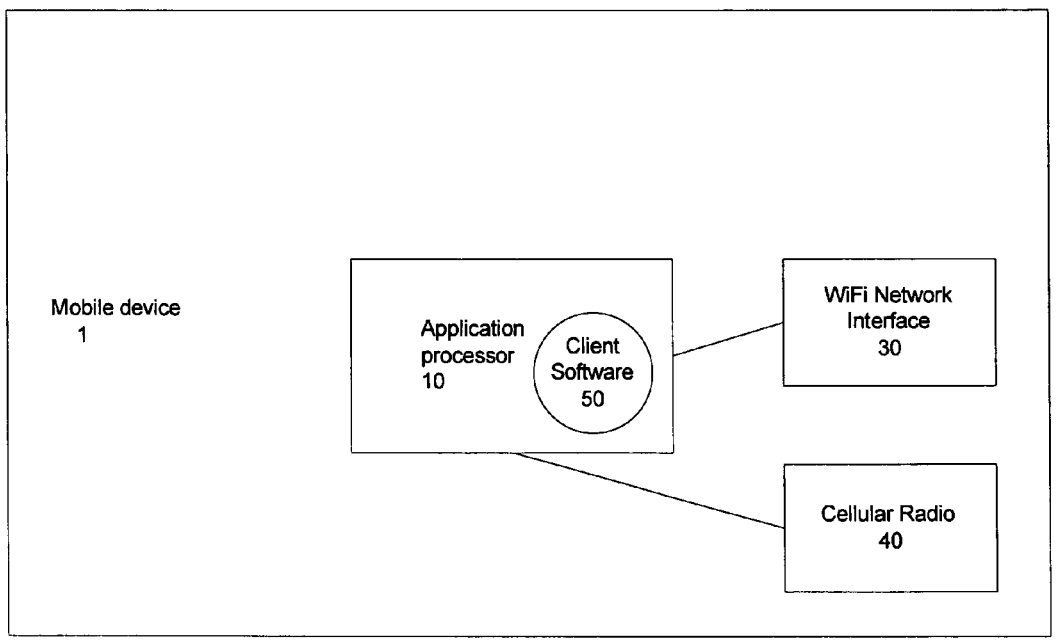
FIG. 25 illustrates an exemplary mobile device in accordance with certain embodiments.

FIG. 25 shows an exemplary mobile device according to certain embodiments, which includes a WiFi transceiver, 30, and a cellular transceiver 40. The device also incorporates an application processor, 10 on which client software 50, executes to carry our certain aspects of the present disclosure.

One method for learning about the location and characteristics of wireless network transmitters, is to collect contemporaneous wireless network and GPS measurements from terminals that are equipped with a GPS such as illustrated in FIG. 23. In this case the GPS measurement provides the reference location enabling the footprint of the corresponding cell to be estimated and optionally the location and some characteristics of the cell to be estimated.

Figure 11:
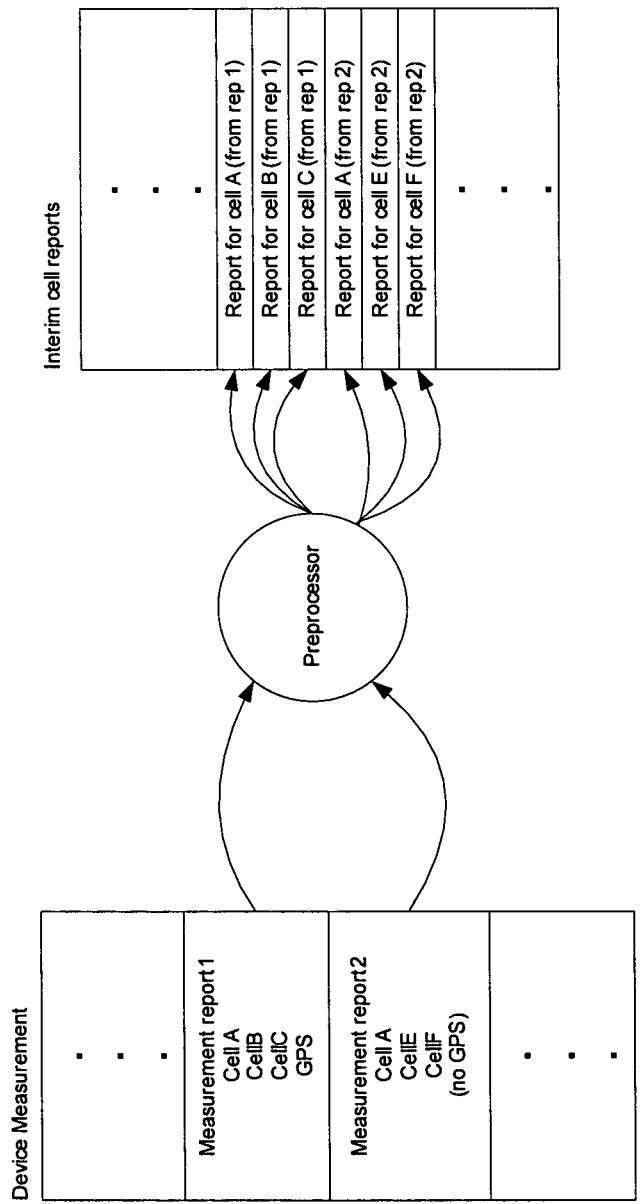
FIG. 11 illustrates an exemplary processing of reported measurements in accordance with certain embodiments.
Figure 12:
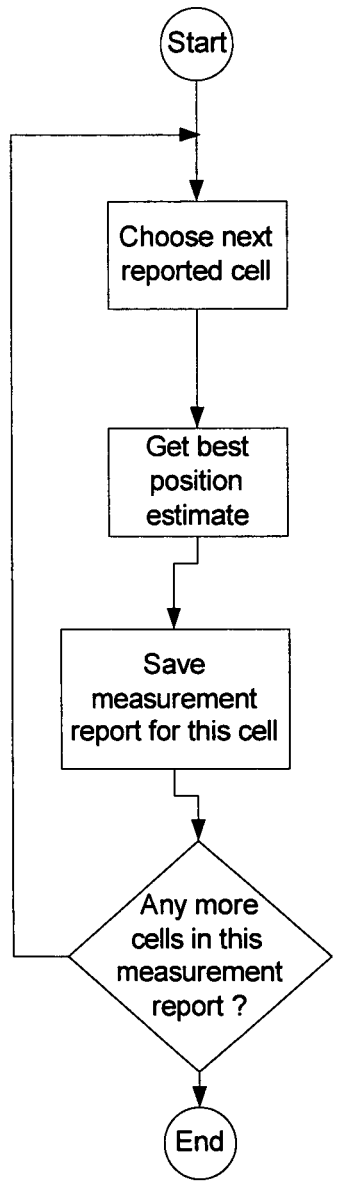
FIG. 12 illustrates an exemplary logic flow for parsing a cell report in accordance with certain embodiments.
Figure 13:
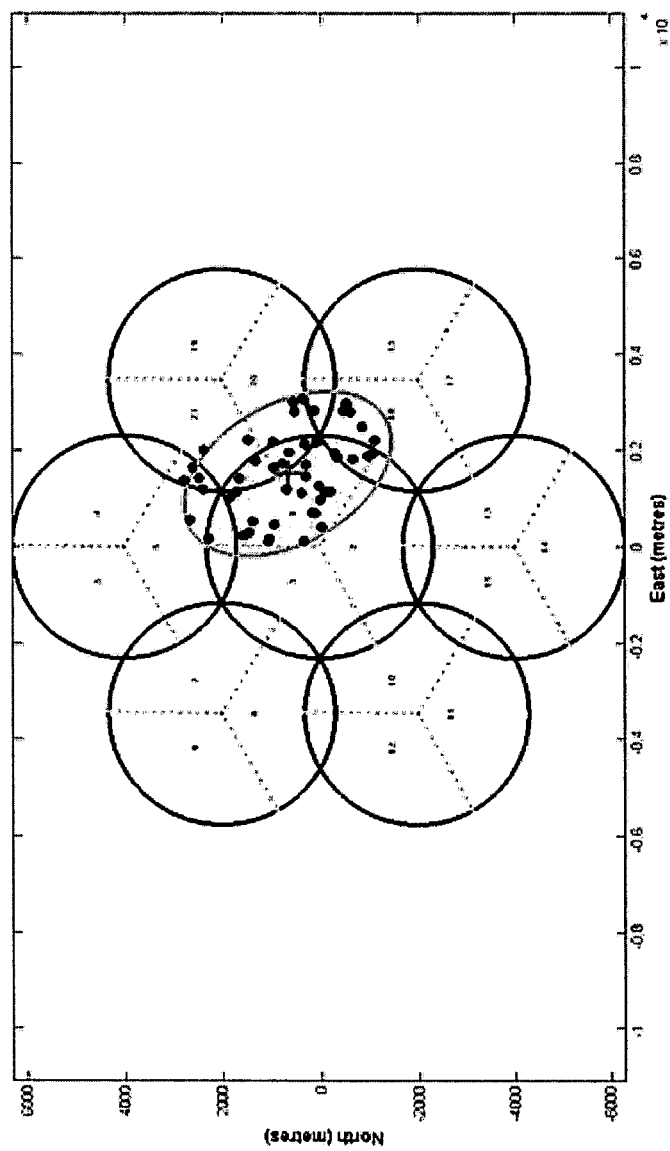
FIG. 13 illustrates an exemplary cell sector diagram in accordance with certain embodiments.
Figure 14:
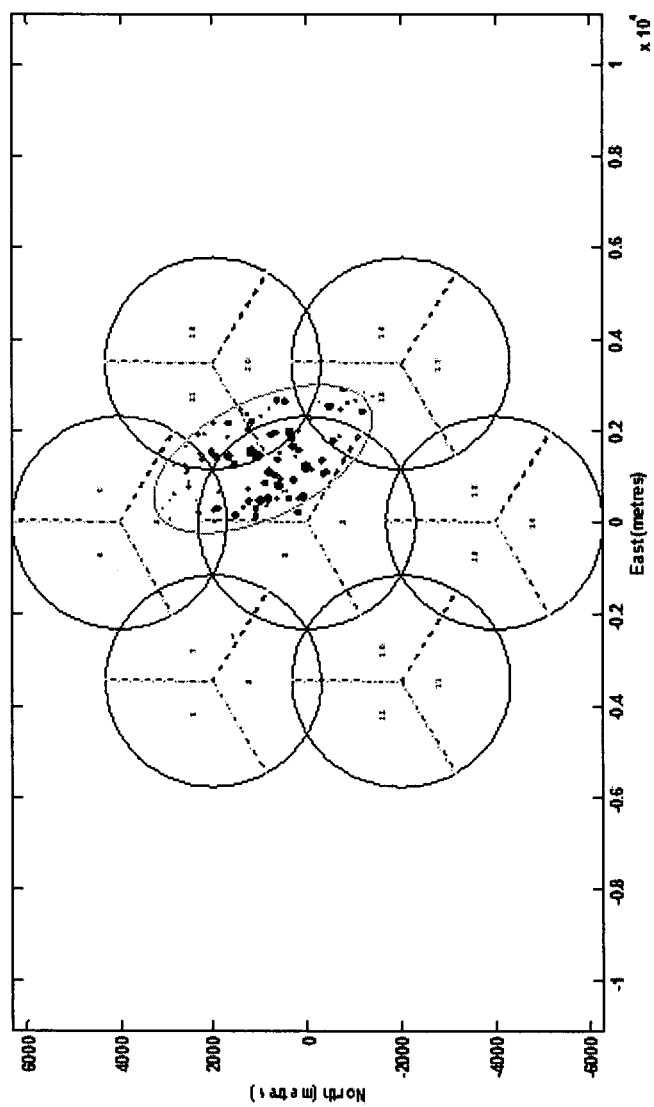
FIG. 14 illustrates another exemplary cell sector diagram in accordance with certain embodiments.
Figure 15:
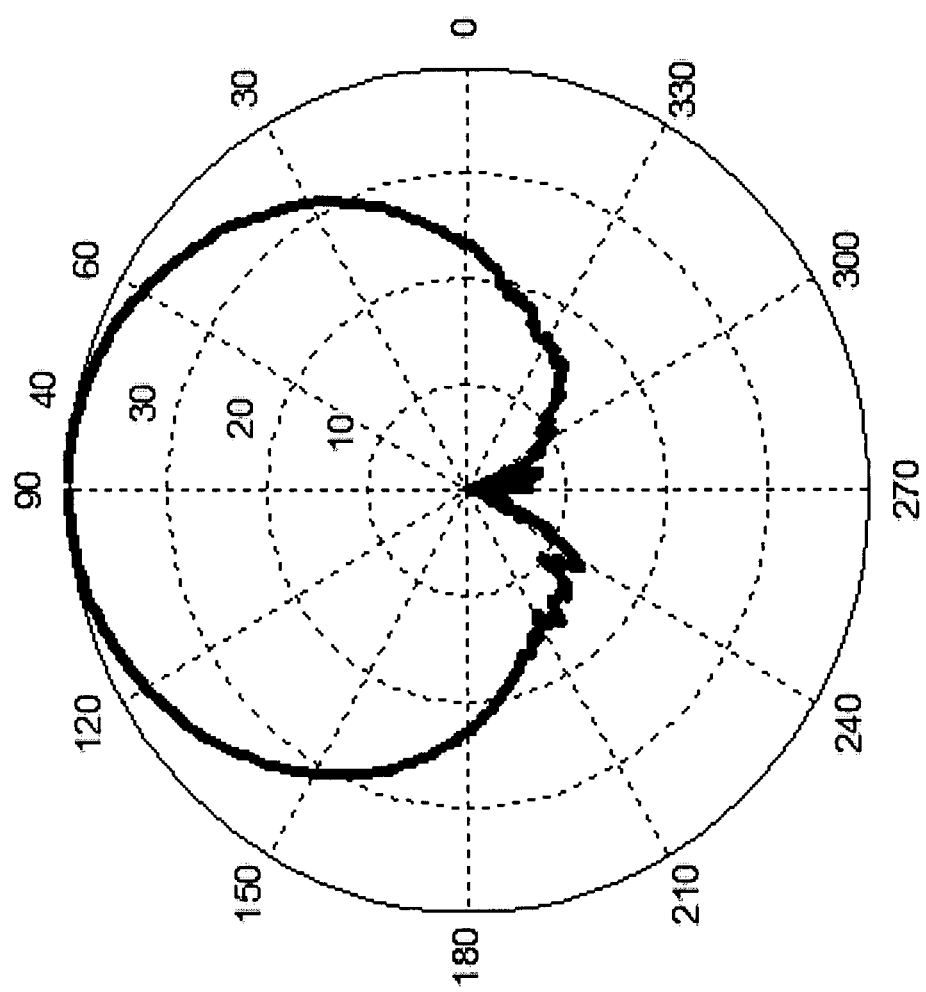
FIG. 15 illustrates an exemplary antenna pattern in accordance with certain embodiments.

Client software on the wireless mobile device detects those cases where the GPS and cellular radio are active simultaneously and collects measurements from both, then reporting them to the server. This reporting could be via any one of several channels including, for example, TCP/IP connection over Wi-Fi, TCP/IP over cellular, over wireless CS connection or via SMS, or any suitable combination thereof. In certain devices the client may detect the availability of a GPS position fix by registering via a specific API for notification of such events. FIG. 11 illustrates exemplary processing of the reported measurements at the server where a reference measurement or report corresponding to each cell featured in the measurements is extracted and stored for subsequent use in updating the characteristics associated with each cell. FIG. 12 illustrates an exemplary processing flow for the processing carried out on a measurement report containing one or more cells.

In embodiments where there is wide distribution of client software, this opportunistic approach to measurement collection will provide a steady stream of measurements. However, it may be unlikely that indoor cells would be reported with GPS because of the typically poor performance of GPS indoors.

Because simultaneous network connection and GPS usage may be infrequent, the client may also retain the most recent cellular and/or GPS measurements. If a GPS fix becomes available without a network connection being active, the client can store the measurements for transmission to the server at a later time.

In certain embodiments, an enhancement is to provide a mechanism to drive the acquisition process so that valuable information can be reported, while less valuable information is not. Focusing the reporting in this way can minimize the signaling required from subscriber terminals and also reduce the infrastructure capacity required to deal with reports while at the same time achieving fast acquisition of the radio network information.

Certain embodiments of the present disclosure provide a mechanism for this by communicating information on the state of the current database. Typically in a GSM network, each cell is assigned a unique cell ID, which is represented using 16 bits. This means that there are $2^{16}$ possible different cell IDs. The system can communicate a list to any or all of the clients that reflects the cell IDs that the network database server currently has information about. This list could be expressed as a bit map of $2^{16}$ bits, where the value of each bit represents whether the server already has sufficient information (also referred to herein as the quality of the information) about a cell having the corresponding cell ID or not. In some networks cell IDs may not be assigned uniquely. In this case the cell ID plus LAC combination is usually unique. Accordingly, in certain embodiments the tasking encoding may be extended to accommodate LAC and cell ID.

Using this approach, the reporting efforts of the clients can be focused on cells that are unknown thereby enabling the system to acquire information on unknown cells more efficiently and rapidly than simply adopting an opportunistic approach based on subscriber usage of the location services. The information describing the current state of the radio network model to guide the reporting behavior of clients is hereafter referred to as tasking information since it effectively describes the measurement task to be completed by the clients. Tasking information may be maintained for cellular networks where the range of cell IDs is limited. Separate tasking information may be maintained for each cellular network being modeled (and also separate information for 2G/3G). In certain embodiments, tasking information is provided to a client only for the cellular network currently being used by that device. In alternative embodiments, tasking information may be provided for a network that the device is capable of using but is not currently using (e.g., a 3G phone camped on a 2G cell). The selection of which set of tasking information to provide to a client is determined from the network identity reported in either network reports or location measurements from the device. In cases where the user travels to a different country and therefore roams onto another network, the system may update the tasking information if that network has been configured for monitoring. Otherwise, the existing tasking information may be left in place.

Having received the tasking information, each client continually monitors the serving cell currently camped on by the device. If it encounters a cell ID which is marked in the tasking list as unknown, then it records the information (including rxLev if available) and prepares a report for transmission to the server. In contrast to the simpler case where measurements are reported opportunistically, this converts each client into an active searcher, wherever the subscriber carries the device.

In certain embodiments the tasking information changes as the network database model is updated in response to reports from clients. Preferably the tasking information will be versioned in sync with the corresponding network database model. In certain embodiments the tasking information may be pushed to any or all active clients whenever it is updated. In an alternative embodiment, the availability of an updated version of the tasking information may be signaled to any or all clients, enabling clients to pull the updated information from the server at a suitable time (i.e. when a suitable connection is available). In this case the availability could be signaled via, for example, SMS while the updated information could be downloaded via SMS or an alternative bearer such as, for example, general packet radio service (GPRS), enhanced data rates for GSM evolution (EDGE), high-speed packet access (HSPA), or CDMA2000 EV-DO.

The tasking information can be enhanced further to take into account the quality of the information that could be reported. The primary information accumulated is the location of each cell. The usefulness of a particular observation pertaining to a cell depends partially on the observed signal power. If a previously unknown cell is observed with a relatively weak signal level (e.g., −90 dBm) and a GPS fix is available, this conveys relatively weak information on the location of the cell. In contrast, an observation at a level of −50 dBm would indicate that the device is currently situated very close to the cell and a contemporaneous GPS fix would convey relatively precise information on the location of the cell. Therefore a further enhancement to the tasking information is to represent the current state of each cell in the network using more than one bit, reflecting the quality of information held in the current version of the network database. As an example consider the case where 2 bits are used.

An example of how the values could indicate the quality of the information currently held by the network database server and the corresponding reporting behavior required is shown in Table 1 below. When a client hears a particular cell ID, it can consult the tasking table and determine whether to report the cell based on the quality of the current observation.

TABLE 1 use of multiple bit cell quality information

| Binary value | Interpretation | Action |
| --- | --- | --- |
| 00 | cell is unknown | Report if measured |
| 01 | coarse location information to date | Report if measured with rxLev > −90 dBm |
| 10 | moderate accuracy information held | Report if measured with rxLev > −70 dBm |
| 11 | good quality information held | Report if measured with rxLev > −55 dBm |

In this way, during the initial period of service, clients will report cells more frequently and as the network information stabilizes, the reporting rate will slow, except for unknown cells. The actual threshold rxLevs corresponding to each quality setting could be transmitted with the tasking information to provide more dynamic control over the reporting.

Figure 4:
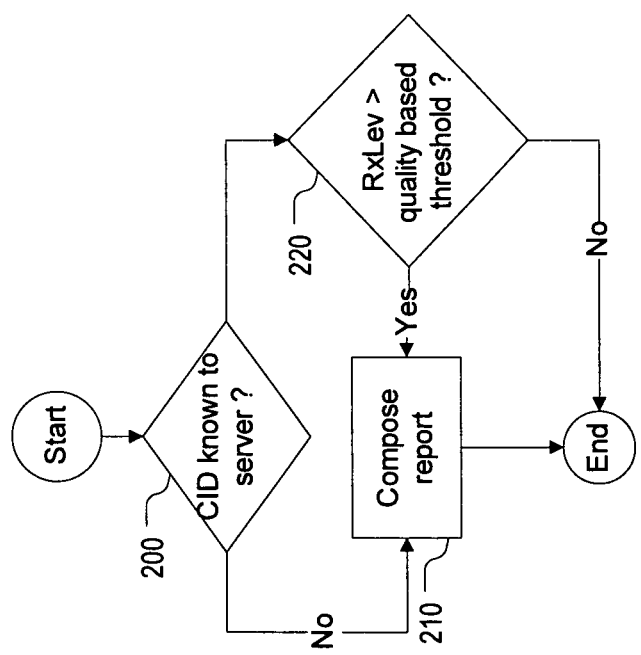
FIG. 4 illustrates an exemplary logic flow for determining whether to generate a cell report in accordance with certain embodiments.

While the previous paragraphs describe the use of either 1 or 2 bits to encode the current state of each BTS in the network, this is not a fundamental limitation. More generally, any number of bits could be used to convey the quality information. The reporting thresholds could be either implied, dividing the typical signal reception level from −50 dBm to −105 dBm into fixed size steps. Alternatively the thresholds could be explicitly encoded and transmitted to the clients. FIG. 4 illustrates exemplary logic which can be used by a client to determine whether a report should be generated for a cell if a GPS position fix is available. The client first determines whether the cell ID is known to the server in step 200 based on the tasking information. If not, the client composes a report in step 210. If it is known, the client determines if the rxLev is greater than a quality based threshold in step 220. If the rxLev is greater than the quality based threshold, then the client composes the report.

The tasking information for a GSM or UMTS network can be encoded in 8 KB if one bit is used per cell to encode the current cell state in the network model. For clients deployed on terminals that are used for mobile web browsing etc., this represents a relatively small data download. Nevertheless it will be important not to disrupt the user's activities with a download like this. Preferably the client will wait for a suitable opportunity for performing the download in order to minimize the degree to which the user is affected.

Optionally the tasking information can be conveyed in smaller chunks. For instance the 8 KB could be transmitted at different times in 1 KB blocks, accompanied by a header which specifies the starting cell ID for that block.

In certain embodiments, where there is less need to minimize the data downloaded from the server, the tasking information for a cellular network may be conveyed as a list of cell IDs currently represented in the database. Optionally each cell ID may be accompanied by the corresponding LAC. Additional bits may also be provided, representing the current quality of the information corresponding to that cell held in the database. In certain embodiments the information may be compressed prior to transmission. For instance a delta encoding scheme applied to an ordered list of all the Cell IDs known in a network may yield considerable reduction in the size of the data to be transmitted.

In normal operation, the tasking information would be updated from to time as the network model evolves. In this case it may be more efficient to update in smaller blocks, perhaps only for those blocks where there have been significant changes. There is no lower limit on the size of the block, even an update for a single cell can be transmitted in a single update.

In certain embodiments only a subset of the tasking information may be provided to a particular client, based on the current location of the client as determined from recent measurements in order to decrease the volume of data to be downloaded. For example, using the LAC reported from a cellular transmitter, only tasking information pertaining to that LAC and immediately neighboring LACs may be provided.

In certain cases the tasking information in a region of the network may be updated to stimulate greater reporting of measurements for a time. This could be done for instance if a substantial change was detected in a particular network. This might occur for instance if a cellular operator undertook a major reassignment of cell ID or LAC values across some or all of the network. Such changes may be anticipated in the future as cellular operators effect radio network sharing agreements and rationalize cell sites. A suitable trigger for deeming a substantial change to have occurred could be the detection of a certain number of previously unknown Cell IDs in a short period of time in a region where previously there were few or no unknown cells reported. For example 5, 10, 15, 20, or 25 unknown cell ID values in a region in a 24 hour period might be considered a substantial change. A further aspect of certain embodiments is a facility to command the client to enable the GPS device if one is present, in order to obtain a GPS position measurement for the current transmitters. After enabling the GPS, the client may wait up to a certain period for the GPS to acquire a position solution and report the position information along with the recent wireless measurements, before disabling the GPS once again to avoid excessive battery drain.

Certain embodiments incorporate a further enhancement to the measurement collection to further accelerate the acquisition process. Because of the relatively low frequency of GPS usage by a typical user in a familiar context, the availability of GPS based cell location reports may be too infrequent for rapid initialization and also to detect changes in the network configuration.

In order to accelerate the rate of information collection, the client can also collect and report patterns of measurements which reflect spatial proximity between two or more cells. Following the same tasking pattern as describe above, when observing a new serving cell, the client can consult the tasking list to determine whether to prepare a report for transmission (in certain aspects the report can be saved for later transmission piggybacked on a network connection established by the user).

Consider first the simple case where the current state for each cell is represented with a single bit (known/unknown). When the client detects a new serving cell, it checks whether a report is warranted. This could be the case if one or the other of the current or previous serving cells is known and the other is unknown. In this case a report sent to the server conveying the information concerning the unknown cell situated somewhere neighboring the known one enables the server to compute an initial coarse estimate for the location of the unknown cell. The conditions for reporting can naturally be extended beyond immediate adjacency. If 2 consecutive serving cell observations corresponded to unknown cells and the $3^{rd}$ cell in the sequence was a known cell, then a report would still be warranted. The client would report not only the two most recent serving cells but also the $3^{rd}$ most recent as it was unknown as well. Preferably the client also reports the time interval between the observations of the different serving cells enabling the server to make an allowance for possible terminal movement.

Figure 5:
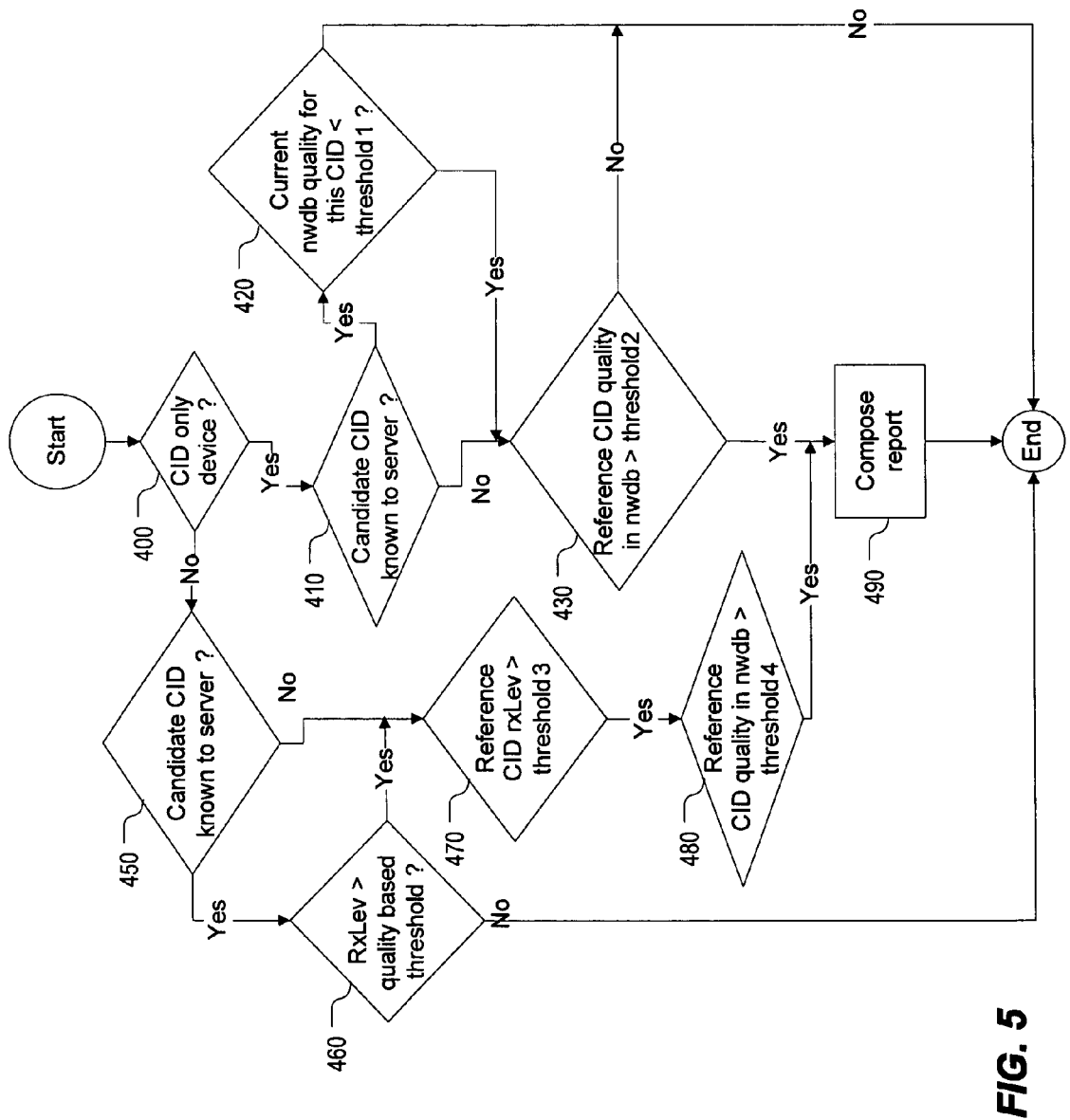
FIG. 5 illustrates another exemplary logic flow for determining whether to generate a cell report in accordance with certain embodiments.

The reporting conditions could be specified more tightly by using more than one bit to represent the quality of the cell information in the network database server. FIG. 5 illustrates exemplary logic used to determine whether to generate a report for one cell using another cell reported at a similar time as a location reference. In the following description, when referring to information that is known to the network database server, this can be, for example, based on the tasking information stored in the client. The client first determines if the device is a cell ID only device in step 400. If it is a cell ID only device, then the client determines if the cell ID is known to the network database server in step 410, and if so it determines if the current quality known to the network database server for this cell is less than a first threshold in step 420. If the cell ID is not known to the network database server, or if the current quality known to the network database server for this cell is less than the first threshold, then the client determines if the cell ID quality known to the network database server is greater than a second threshold in step 430. If so, then the client composes a report. Referring now to the case where the device is not a cell ID only device (e.g., the device is also capable of determining rxLev), the client determines if the cell ID is known to the network database server in step 450. If so, then the client determines if the rxLev is greater than a quality based threshold in step 460. If the cell ID is not known to the network database server or the rxLev is greater than a quality based threshold, then the client determines if the reference cell ID rxLev is greater than a third threshold in step 470. If the reference cell ID rxLev is greater than the third threshold, then the client determines if the reference cell ID quality known to the network database is greater than a fourth threshold in step 480. If so, then the client composes a report in step 490.

A similar mechanism may be employed to report information concerning the location of Wi-Fi Access Points with respect to GPS. In certain embodiments, the client software monitors for the availability of GPS & Wi-Fi measurements and records any detection in the measurement buffer with the associated timestamp. In some cases, depending on the capabilities of the wireless device and the facilities supported by the platform, the client may initiate an active scan for APs. This may be done by issuing a request for the 802.11 hardware to transmit a probe request to all APs in range. For Wi-Fi APs the information recorded includes both the MAC address as well as the signal strength. Note that the measurements may not contemporaneous. If a GPS measurement is available at one instant and then a few seconds or minutes later one or more Wi-Fi APs are detected, the client will retain both sets of measurements and report them if the other reporting criteria are met. The network database server processing takes account of the effect of any time interval between the GPS and Wi-Fi measurements by increasing the location uncertainty appropriately.

Figure 6:
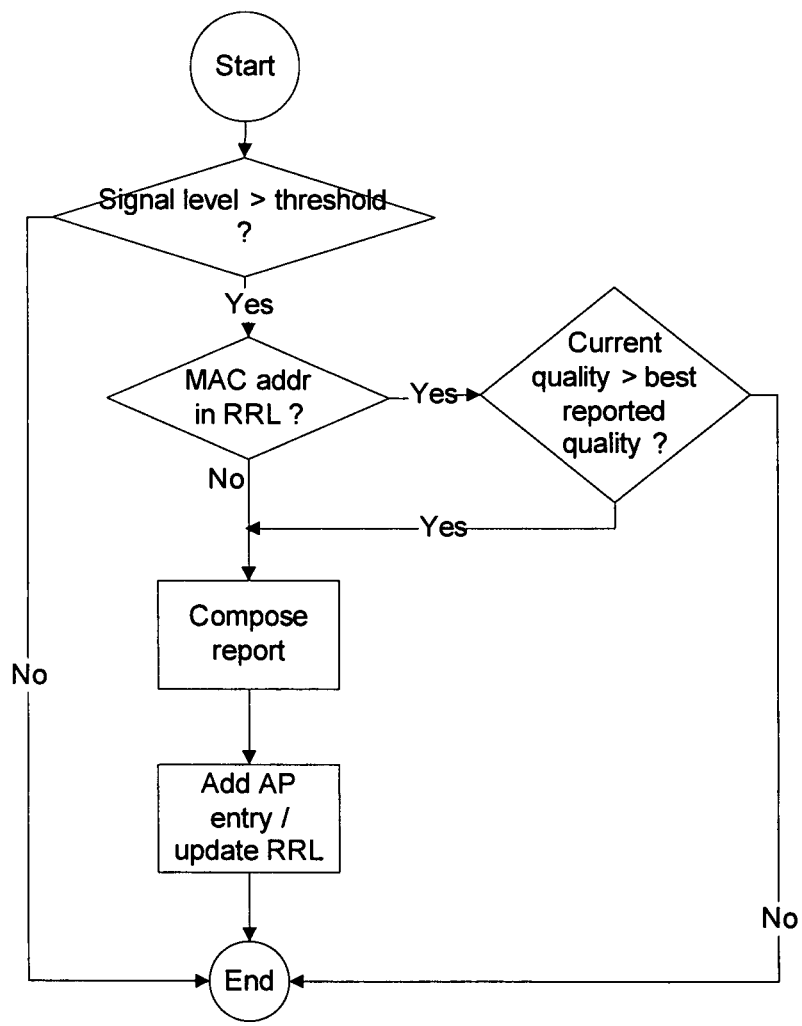
FIG. 6 illustrates a further exemplary logic flow for determining whether to generate a cell report in accordance with certain embodiments.

In order to avoid repeatedly transmitting reports concerning the same AP, the client may keep a list of the MAC addresses for APs which it has reported in a recent report list (RRL). The length of this list depends on factors such as the available memory and the expected density of APs in the areas where the client will be deployed. Suitable RRL lengths may range from 10 to 10000 (100 may be a suitable value in typical implementations). For each MAC address in the list, one or more of the time last detected, the best quality of any detection for that AP as and the number of times the AP has been observed since it was added to the list may be retained. When the RRL is full and a new AP is detected, the least important entry may be purged and replaced with the latest AP. The order of importance is determined based on the number of times the AP has been detected and a combination of the time since it was last detected and the best detection quality. This is advantageous because there will typically be a set of APs situated in locations that are frequently visited by the user. Retaining these APs in the list is likely to have the greatest benefit in minimizing the transmission of duplicate reports for the same AP. Compared to some existing systems in which user devices are merely located based on Wi-Fi measurements they report, the recently reported list disclosed here provides sufficient protection against continual reports of the same cells to enable the acquisition of information about APs to also be implemented in user devices. An exemplary processing flow for deciding whether to generate a report for a Wi-Fi AP when a measurement is available and one or more GPS measurements are also available is shown in FIG. 6.

Figure 9:
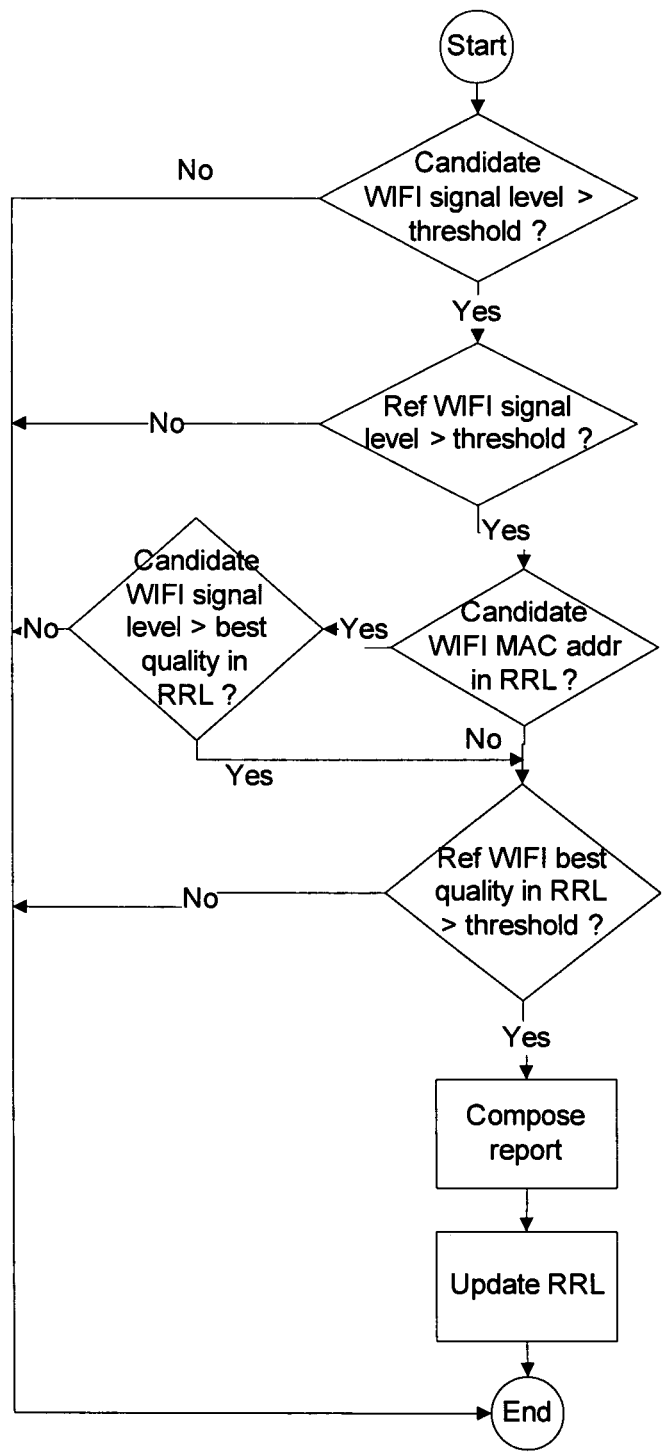
FIG. 9 illustrates another exemplary logic flow for determining whether to generate a cell report in accordance with certain embodiments.
Figure 10:
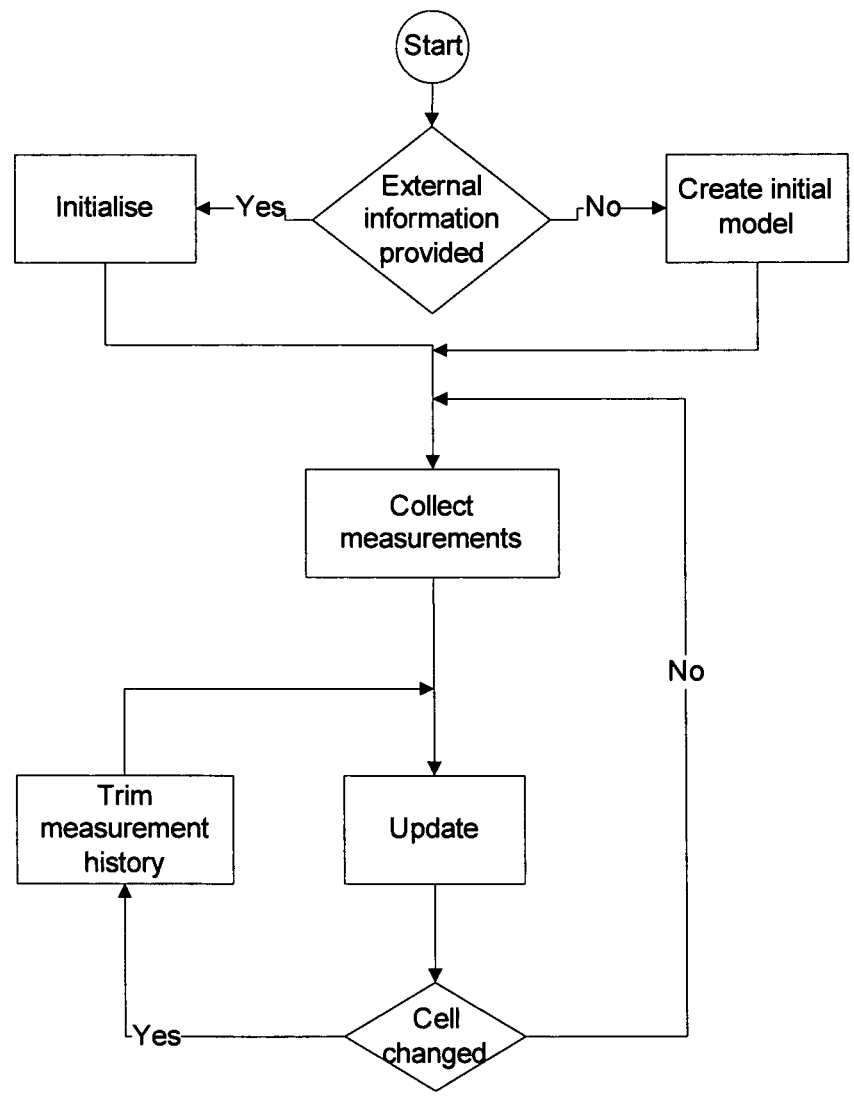
FIG. 10 illustrates an exemplary cell model life cycle in accordance with certain embodiments.

In some cases it may be advantageous for a client to report measurements for one or more Wi-Fi APs using another Wi-Fi AP whose location has already been measured to a sufficient degree of accuracy as a location reference. FIG. 9 illustrates exemplary decision logic for this scenario.

Since the coverage area of a Wi-Fi AP is typically limited to a few tens or hundreds of meters, contemporaneous measurements of a known Wi-Fi AP and an unknown cell can yield useful information for the server on the location of the cell. Furthermore in everyday usage there are likely to be more devices in a given area with Wi-Fi & cellular enabled than GPS and cellular. Therefore having obtained a GPS location fix for a Wi-Fi AP, it is possible to leverage the smaller footprint of the Wi-Fi AP to provide relative location measurements for cellular base stations. A further advantage of having location information for Wi-Fi APs is that dual mode devices from different cellular networks are likely to share the AP, thereby enabling location information concerning a single AP to be leveraged to refine the location estimate for cells from all surrounding cellular networks.

The tasking framework described before can be applied here as illustrated in Table 2 for the case where 2 bits are used to encode the quality per cell. If a Wi-Fi AP can be detected strongly then the client checks the serving cell. Depending on the strength of the serving cell measurement and the state of the cell in the tasking information, a report may be prepared for transmission.

TABLE 2

| Binary value | Interpretation | Action |
| --- | --- | --- |
| 00 | cell is unknown | Report if measured |
| 01 | coarse location information to date | Report if measured with rxLev > −90 dBm |
| 10 | moderate accuracy information held | Report if measured with rxLev > −70 dBm |
| 11 | good quality information held | Report if measured with rxLev > −55 dBm |

Advantageously, certain embodiments of the present disclosure enable the client to focus the reporting of cellular measurements using Wi-Fi APs as a location reference to only those cases where the Wi-Fi AP is known to the network database server (thereby yielding a location reference). With cellular base stations, the use of the tasking information described above enables the client to determine which cells have good quality location information associated with them in the database. The vast number of different APs and associated MAC addresses however may makes it difficult to distribute the corresponding tasking information about known and unknown MAC address ($2^{48}$ combinations). A local version of the tasking information is available however in the Wi-Fi history list. Since the client maintains the list of Wi-Fi APs that it has reported to the network database server and the best quality reported, it can determine whether one or more of the current APs are known to the server (based on a previous report from this client) and whether it is likely to be known with sufficient quality to serve as a location reference for an unknown cellular BTS.

Figure 7:
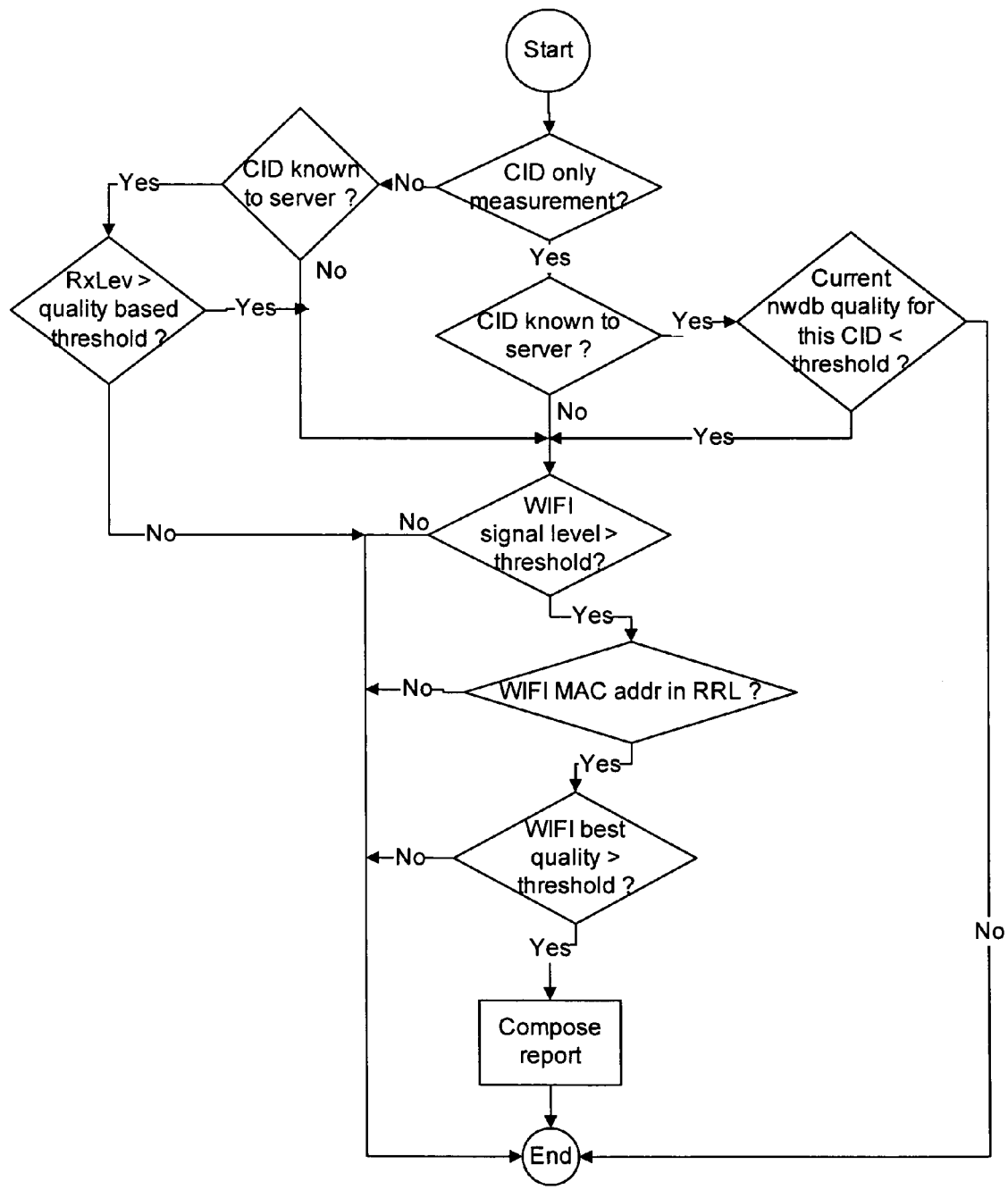
FIG. 7 illustrates a still further exemplary logic flow for determining whether to generate a report in accordance with certain embodiments.

FIG. 7 illustrates exemplary logic by which a client can determine whether to generate a report for a cell using a Wi-Fi measurement to provide a location reference.

The reverse reporting mechanism may also be applied in some cases, i.e. a measurement for one or more Wi-Fi APs is reported to the server using contemporaneous cellular measurements to provide the location reference. If the network database server holds relatively accurate information about the location of a cell and the terminal while camped on that cell can also hear a Wi-Fi AP, then the client can report the pair of measurements contributing to the network database server learning for that AP.

In this case the client can be programmed to generate a report only in the case that the terminal is sufficiently close to the cellular base station to constrain the location of the Wi-Fi AP to a useful level of accuracy (reflected in the cellular rxLev exceeding a threshold). A suitable threshold rxLev for the cell could be, for example, −60 dBm, although any other suitable value could be used such as between −50 dBm and −80 dBm. The actual value could be defined in the tasking information sent to clients to enable it to be adjusted dynamically as the network model converges.

Figure 8:
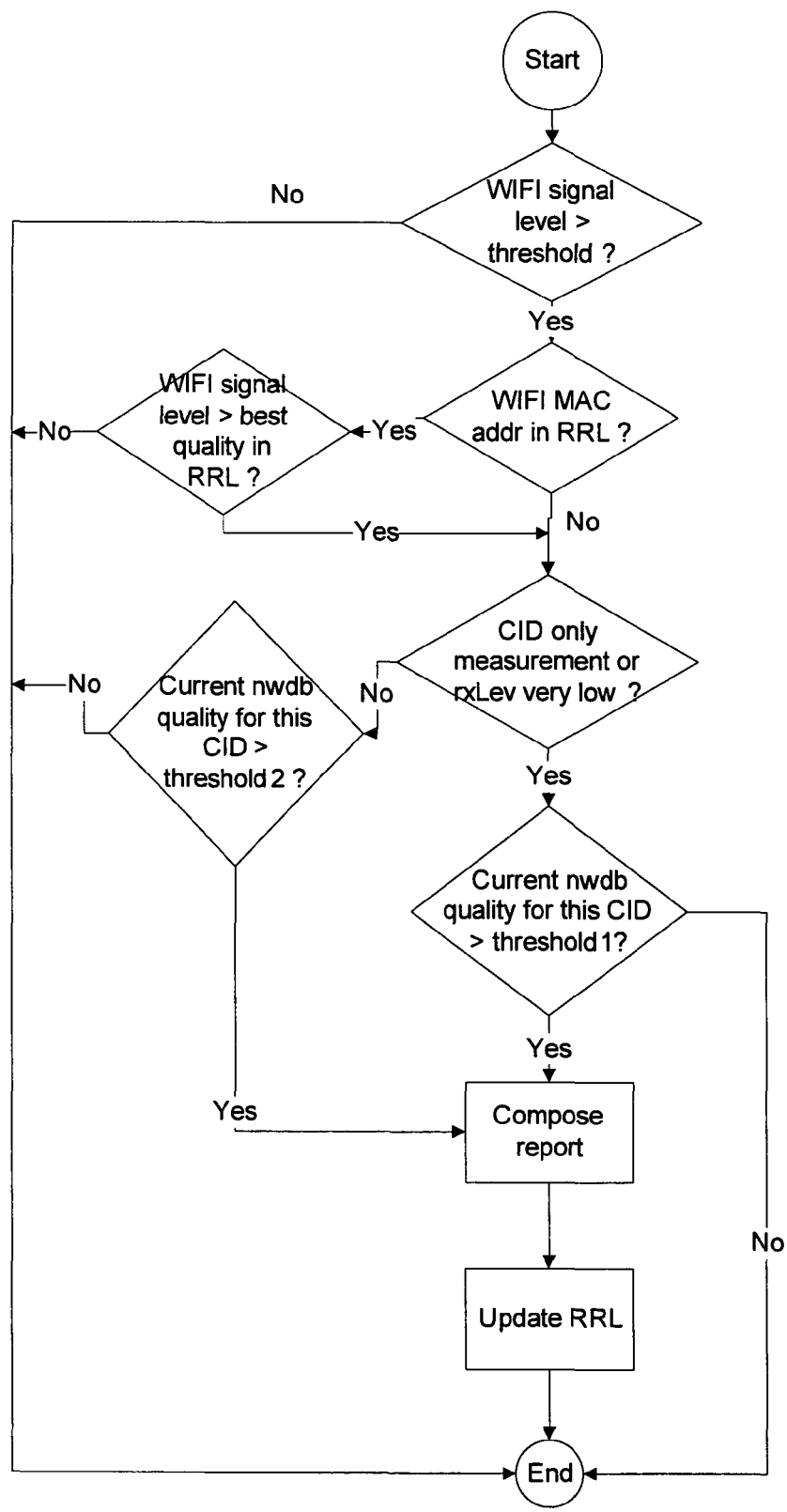
FIG. 8 illustrates a yet further exemplary logic flow for determining whether to generate a cell report in accordance with certain embodiments.

In many cases, if the terminal is connected via the Wi-Fi AP, the cost of transmission is likely to be lower than the equivalent cost for cellular data so the threshold might be adjusted to enable greater reporting rates than over cellular, for example by lowering the threshold to −90 dBm. FIG. 8 illustrates an exemplary processing flow by which the client can determine whether to generate a report for one or more Wi-Fi APs if contemporaneous cellular measurements are available.

From time to time the client application may collect measurements pertaining to one or more wireless networks, GPS, or any suitable combination thereof. The specific types of measurements will vary from device to device according to the capabilities of the device, the surrounding environment and also user configuration settings for the device. In certain embodiments, the client collects and stores any measurements in a time tagged format. When a report is to be encoded for transmission to the server the measurements at that time are analyzed and one or more is encoded depending on the relative priorities of the measurements as well as the capacity available in the reporting channel. For example if a single binary SMS is to be used, then the space available is 140 octets.

Report:=*MCC*+*MNC*+0{CellTableEntry}+0{ShortId-TableEntry}+0{WifiTableEntry}+0{MeasurementTableEntry}+0{GPSTableEntry}

CellTableEntry:=*LAC*+*CID*

ShortIdTableEntry:=*ARFCN*|*UARFCN*+*BSIC*|*PSC*

WifiTableEntry:=*MAC*Address+*SSID*+Age

MeasurementTableEntry:=TableIndex+Age+MeasurementType+(*rx*Level)+(TimingAdvance)

MeasurementType:=CellTable|ShortIDTable

GPSTableEntry:=Latitude+Longitude+Accuracy+Age

The structure of the tables means that for a given report any of the tables may have measurements or may be left empty according to the information currently held in the measurement table. The encoding format means that GPS measurements may be included as opportunity affords. Advantageously, this minimizes battery depletion by not powering on the GPS solely for network acquisition but rather capitalizing on opportunities where the user has activated the GPS.

Certain embodiments provide further methods for controlling the reporting of WiFi Access Point information. The aim of these methods is to provide a mechanism for measurements corresponding to Access Points to be reported by some or all clients, in a manner which means that any given client is unlikely to provide duplicate reports of the same Access Points and different clients will commonly not provide duplicate reports of the same Access Points. The motivation for these constraints is twofold. Firstly all such reporting requires additional signaling over and above the signaling directly associated with providing a service to the user and as such should be kept to an absolute minimum. Secondly, in view of the large numbers of users and transmitters involved, from a server scaling perspective a vast number of duplicate reports will necessitate considerable extra investment in processing and storage resources for marginal gains in system performance and user satisfaction and therefore again should be minimized.

Figure 22:
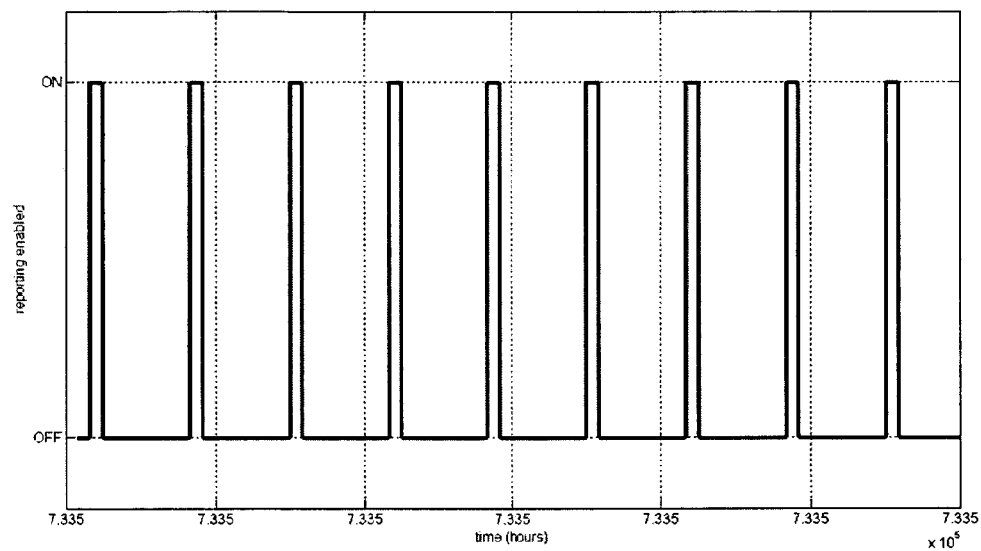
FIG. 22 illustrates a binary comparison that is carried out over a week, in accordance with certain embodiments.

The collection of WiFi measurements therefore may be controlled through one or more gating functions. One suitable gating function is based on the date/time, otherwise referred to as a calendar based gate. It operates to only enable the collection of WiFi measurements for certain periods of time. One implementation employs a bit mask to define the allowed times. The mask may be applied in a bitwise comparison operation with a binary representation of the current date and time, read from the device. Reporting is then enabled for any hours in which the mask and the corresponding bits in the hour counter match. Depending on the arrangement of the mask and the binary representation for the date/time, the reporting windows on different days will occur at different times of the day. This may be a desirable result in certain instances as it increases the likelihood of diversity in the collected measurements for users who follow a common routine each day meaning that measurements collected at similar times each day would be likely to feature substantially the same transmitters. The actual date/time gating bitmask may either be provided to the client by the server or else it may be derived by the client from a user ID or the device identifier or other suitable characteristic information which is likely to be virtually unique for that user/device. It should be noted that a variety of other numerical or logical operations could be substituted for the one described here to achieve a similar effect, namely to enable measurements to be collected by one or more devices at different times and in different places, achieving the desirable result of increasing the diversity of the collected measurements. For instance the mask could be used to obtain coefficients of a discrete filter through which the binary representation of the date/time is passed. As an example consider an implementation where the time is measured in units of hours from some suitable reference point. The binary comparison is carried out between the least significant 3 bits of the hour counter and the bitmask. A sample for the first few hours are listed below in Table 3. FIG. 22 shows the results over a complete week. Using this particular mask value with the least significant 3 bits of the hour counter would mean that the device would be enabled for reporting approximately 12.5% of the time.

TABLE 3

| Hours | Bitmask | Result |
|---|---|---|
| 00000000 | 110 | No |
| 00000001 | 110 | No |
| 00000010 | 110 | No |
| 00000011 | 110 | No |
| 00000100 | 110 | No |
| 00000101 | 110 | No |
| 00000110 | 110 | No |
| 00000111 | 110 | No |
| 00001000 | 110 | No |
| 00001001 | 110 | No |
| 00001010 | 110 | No |
| 00001011 | 110 | No |
| 00001100 | 110 | Yes |
| 00001101 | 110 | No |

A second gate may be employed to decrease the overlap between reports from two or more devices in the same location, once again increasing the diversity of measurements collected by a plurality of devices, where only a finite number of measurements may be collected by each device. One implementation of such a gate uses a subset of bits from the binary representation of the device identifier (for example the IMEI in GSM mobile terminals) or client user ID as a mask. For WiFi reporting, the MAC address of any observed WiFi Access Point is applied to a bitwise comparison with the mask and only APs for which the two operands match are selected for reporting. The following Table 4 illustrates this, showing a few WiFi MAC addresses together with the simple gating bitmask 110 corresponding to the decimal value 6. The 3 bits of the bitmask are applied to the 3 least significant digits of the addresses. The third column indicates the addresses which would qualify for reporting in this case. Assuming uniform, random use of the serial number range in manufactured devices, typically using this mask value, a particular device would be likely to select 1 in every 8 access points to report. Changing the mask to 1110, would decrease this by approximately 50% percent. In practice, the particular range of bits from the MAC address to use may depend on the application. Since the lower bits represent the serial number of the device, typically one might expect to observe greater variation in these bits, particularly in areas where one or two brands of Access Point dominate the marketplace.

TABLE 4

| MAC Address | Bitmask | Result |
|---|---|---|
| 0000000000000000100011000000001011000011000100010 | 110 | No |
| 0000000000000001111000011110100101010101100000000 | 110 | No |
| 0000000000000001111000011110100101010101111001100 | 110 | Yes |
| 0000000000000001111000011110100101010101111110000 | 110 | No |
| 0000000000000001111000011110100101010101111110100 | 110 | No |
| 0000000000000001001101100000001001001100110010111 | 110 | No |
| 0000000000000001001101100000001001001101011111001 | 110 | No |
| 0000000000000001001101100000010101000011101011110 | 110 | Yes |
| 0000000000000001001101100000101001011011101011111 | 110 | No |
| 0000000000000001001101100000110001110011111011010 | 110 | No |

Two or more gating functions may be used in combination to provide greater flexibility in controlling the measurement collection. If the two gating functions described above are combined, the selectivity of either gate may be varied to suit the measurement collection requirements of the system at any time. For example, in the early stages of service launch when the user population is smaller and the coverage of the transmitter database may be limited, it may be preferable to increase the reporting rate. This can be achieved by shortening one or both of the bit masks used in the calendar and device specific reporting gates. For example decreasing the length of either of the bitmasks by one bit may on average double the likelihood of a particular client reporting any given AP. Adjustments to the configuration of one or more gating functions may be achieved by sending modified gating bitmasks to some or all devices or by sending parameters defining the length of the bitmasks to be derived by the client locally from one or more identifiers associated with the device and the range of bits to be employed in the bitwise comparison. Alternatively the parameters could be pulled by a software client on the device from the server. In certain instances it may be desirable to adjust the parameters for clients according to the geographical region where they are used. For example if a service is launched in one city with a supporting database of transmitter characteristics and then after a period of stabilization the service is extended to a different city, it may be desirable to decrease the rate of reporting in the first city as the database coverage saturates while retaining a higher reporting rate for devices operating in the more recently launched market. In certain embodiments the measurement reporting process may also include a parameter defining a limit on the volume of data or the number of measurements that may be reported in a certain period.

In certain embodiments the client selects information to be reported according to the value that is likely to accrue from the measurement in the context. As an example, if the encoding is being done for a network acquisition report, then the objective could be to report as much information as possible that is not known to the server, along with information that conveys reference position information. Consider a case where a range of cells have been measured in recent cycles, some of which are known and some of which are unknown to the server (determined by the client by examining the tasking information). Assume further that a GPS fix has been recorded recently. The encoding would start with the most recent GPS fix and then in decreasing order of signal strength (if available), the unknown cells, followed by the known cells, space permitting. The reason for encoding unknown cells in reverse order of their signal level is because the stronger the signal level, the tighter the constraint on the location of that transmitter relative to a reference position (GPS in this case). In the case where the particular device does not support rxLev measurements, the unknown transmitter would be reported in increasing order of the time interval between their measurement and the GPS measurement time. Wi-Fi measurements typically would be encoded (space permitting) after at least one measurement per cellular base station has been encoded.

In certain other embodiments, a subset of the transmitter characteristics in the database may be provided to a client application executing on a mobile device, for use in location calculations directly at the device. Furthermore the device may also incorporate a separate location sensor such as a GPS receiver. In such cases an additional selection mechanism may be employed to update the database efficiently. In situations where the GPS is active and has a valid position solution, the client may compare the current position reported by the GPS with the location dependent characteristics of any transmitters currently detected which feature in the information provided from the database. If any significant deviations are found, a selection of radio measurements along with the GPS position information may be reported to the server for use in updating the database. One suitable measure of deviation between a GPS position and a representative location for a transmitter could be calculated as the Mahanalobis distance between the GPS position and a representative position for the transmitter and comparing the result with a suitable threshold. Suitable thresholds for providing a measurement report to the server range between 2.0 and 16.0. Other similar normalized measures of the distance between two points could be employed as would be understood by one of skill in the art. In certain cases, the absolute distance could be compared to a threshold, expressed for instance in meters.

In certain embodiments a device may report measurements to support a location calculation, where the measurements correspond to one or more cells which are currently unknown. In such a case, the lack of any information in the database concerning those cells would mean that no location can be calculated. From a user's perspective this is a very negative experience and one that warrants significant effort to avoid or mitigate. In some current systems when this happens there is simply nothing for the user to do other than move about while sending repeated requests hoping that the device may reselect to another cell that is known to the server.

Advantageously, in certain embodiments the application client can provide a mechanism to work around this. Consider first the case where the cell ID is unknown to the system, but the LAC is known, being associated with several known cells. The location server can return a failure indication to the application server, but can also return a location estimate which corresponds to the centroid of the cells which are currently associated with that LAC. The location uncertainty indicated to the user would also be relatively large, reflecting the footprint of the controller associated with that LAC value. The system can then present a coarse map covering the LAC area and offer the user two options. The first is to use the current displayed location and area to complete the original request. In some cases, this coarse accuracy may suffice; as an example consider a search for a business having a relatively uncommon name. A search in an area covering a few kilometers is likely to still resolve to the correct location. The second alternative for the user is to use the map to try to locate themselves by zooming in and using nearby features such as street names etc to determine their actual location. The user can then specify their location manually to the application via the cursor or any other suitable UI facility. The location specified by the user can then be translated from a screen position to a corresponding physical location by the application and used to update the location. The application can also provide an uncertainty value corresponding to that position measurement based on the current map zoom level. A suitable uncertainty value may be the extent of the displayed map divided by a factor between 2 and 10. The system can then use the location specified by the user in completing the original request, this can be initiated for instance by the application refreshing the request to the server, including the location specified by the user.

In the case that the user does provide a manual input of their current location, aside from satisfying the users service request, the system can also exploit the user specified position as a reference measurement for the currently unknown cell. This measurement can be sent to the gateway as with other network reports. In this case the measurement type in the GPS table indicates that the source of the measurement was human input rather than a GPS device. The benefit of marking manual measurements as such is that with human input there is a greater possibility of gross error, either accidental or mischievous. If subsequent client measurements corresponding to the cell are found to be inconsistent with the user measurement, the re-initialization process illustrated in FIG.

10 when a cell has been detected to have moved, can be initiated more quickly to eliminate the error.

Depending on the latency between receipt of measurement reports and network update processing, it is possible that the same user could make further requests for location based services from the system before the previous manual measurement has been used to add the cell to the network database. In certain embodiments, a further enhancement in the user device is to retain the user specified location locally in memory as long as the device remains camped on any unknown cell(s) as determined from the tasking information. If further location requests are transmitted in this case, the client will include in the GPS table a manual entry reflecting the location previously specified by the user. In this way in a series of requests the user will not be repeatedly confronted with an unknown location response and forced to re-specify the current location. Advantageously, having the client retain the earlier manual location indication from the user enables the subsequent service requests to be satisfied without causing the user's location to persist in the application server.

In some cases an operator may relocate a cell. Compared to the other types of changes which are carried out in the evolution of a wireless network (commissioning new sites, returning etc.) this is a relatively rare occurrence. Nevertheless, if a cell is moved and the network database server fails to detect this and update the database, subscribers making location requests near these cells will start to receive spurious answers. This in turn could damage the reputation of the service provider and decrease the commercial potential of the service in supporting some value added services.

Therefore as measurements corresponding to a particular cell are received and processed, in addition to updating the current estimate, the system will also maintain integrity information for the cell. This can be collected in the form of residuals which are accumulated. In the case of a relocated cell, the residuals will tend to grow over time. By application of a suitable threshold, the system can detect that a change has occurred and simply restart the acquisition process for that cell, using the most recent measurements to initialize the process (rather than eliminating everything and having a period where there is no coverage for that cell). Furthermore the tasking information for such a cell may be updated to trigger additional reporting by clients to achieve a rapid stabilization of the updated model for the cell.

Another common change in cellular wireless networks which certain embodiments of the present disclosure may accommodate is a change of one or more of the parameters used to identify the cell. For example, this could be a change of cell ID in GSM or a change of LAC. The latter is more common as one or more cells are re-parented (i.e. associated with a different BSC). Certain embodiments can identify this as a change of ID (cell ID and/or LAC) based on the fact that one cell in the network will stop receiving any measurements and a new one will start. In certain cases, the actual transmitter site and footprint characteristics remain unchanged, or substantially unchanged, and only the broadcast identity is changed. This may be useful in established GSM networks, where the rate of new cell deployment is low. This means rather than discarding much of the original footprint information and re-commencing the acquisition of an entirely new model, or substantially new model, a more effective approach is to initialize a new model, or substantially new model, but then associate it with the old as soon as sufficient data are available for a statistically significant comparison. The minimum level of statistical significance may depend on the particular service which the database is being used in connection with. In certain instances the significance may be defined in terms of the number of independent reference measurements corresponding to a particular transmitter. Suitable thresholds may range between 3 and 25, 2 and 50, 6 and 40, 5 and 40, 8 and 20, or 3 and 10 measurements. The server will periodically scan for cells that have not been updated for some time and for each such cell, initiate a search for a recently activated cell entry having radio measurements which are consistent with those for the old cell. The time sequence for the matching entries will typically show a clean break around the time that the change was applied in the network. The process for confirming the alignment of the two sets of measurements can be done using any one of the well known tests to confirm that two sets of samples come from the same population.

With Wi-Fi networks a similar scenario could occur if the user replaces one Access Point with another either when upgrading hardware or perhaps following a hardware fault. In this case the new AP will typically serve the same area however the MAC address detected by a Wi-Fi capable device nearby would be different. In a network where there are a proportion of cells that remain unknown to the location server, there is a proportional chance that a subscriber sending a location request with the current serving cell will fail to be served because the location server has no information about that cell. In some cases even reporting the two most recent or three most recent cells may not avoid this if all of these recent cells are unknown. Research indicates that this is one of the greatest sources of consumer dissatisfaction with a positioning service (i.e. failure to obtain a location fix).

A method to dramatically reduce such cases is for the mobile client to maintain a history of serving cell and as each new cell is entered in the accumulator to check from the tasking information whether that cell is known to the location server. In the normal course of purging old measurements from the accumulator, the client never purges a cell if it is the most recent cell that is known to the server. The most recent known cell is maintained along with the elapsed time since the last measurement corresponding to that cell. In the event of a location request, where several recent cells are unknown, the presence of the most recent known cell in the report ensures that the location server can deliver a location estimate, with the position uncertainty adjusted to reflect the elapsed time since that measurement.

Figure 16:
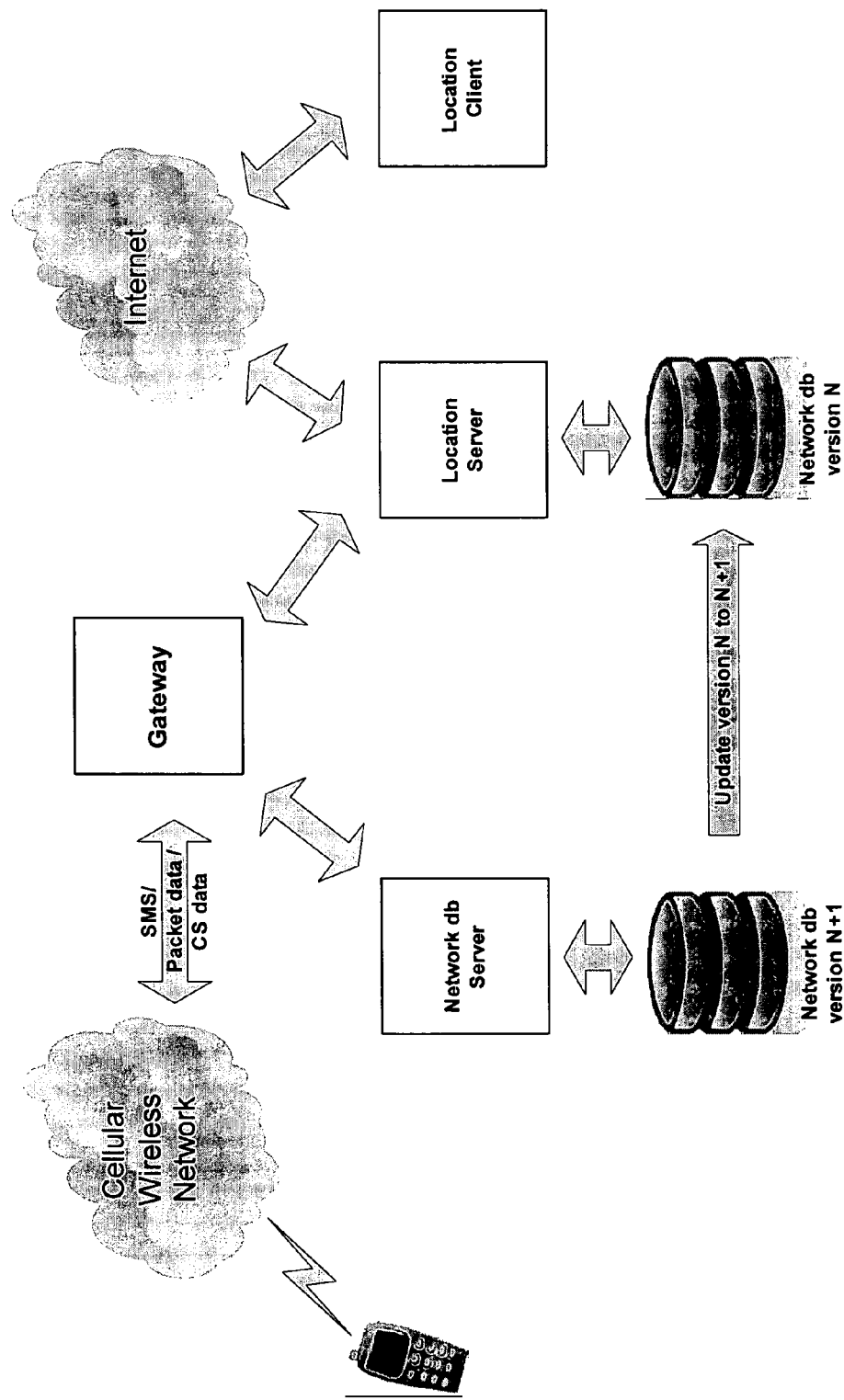
FIG. 16 illustrates an exemplary network architecture in accordance with certain embodiments.

FIG. 16 illustrates an exemplary configuration of a system to support location based services in connection with a single mobile wireless network. Note that in this case, it is the acquisition of the wireless network configuration information that is the focus of the discussion, therefore some aspects of the actual location services aspects including for instance the interconnection to location clients or other application servers are not shown.

In this exemplary embodiment, communication between the user device and the server is via one or more of SMS, packet (UDP/IP or TCP/IP) (over GPRS, EDGE, HSPA, or EV-DO) or even CS data. Indeed different bearers may be used for different exchanges. The main exchanges and their flow are described in the following paragraphs. Note that although the connection is shown as direct from the wireless network to the gateway, this need not be the case. In one scenario, a direct connection could be possible, for instance if the gateway is provisioned with an account on the SMSC or directly connected to the GGSN. On the other hand the connection could be via the public internet. For SMS connectivity, this could be through an SMSC aggregator. For packet data exchanges it could be via the internet, in other words the client relies on a suitable APN to be configured on the device that permits access to the internet and the gateway.

Tasking information from the network database server is sent to the client application on the wireless mobile device. This can be initiated either by a push from the network side if the tasking information has been updated or a pull from the client side if the information needs to be refreshed, based for instance on a time elapsed since last refresh or an indication from the network side that updated information is available.

A network report is sent from the client to the network database server based on triggering criteria at the client including optionally the availability of a connection to the network. The report could be sent via SMS or packet, directed to the gateway. The gateway forwards the report to the network database server for processing.

A location measurement request may be sent from the location server to the client if triggered by a location request from an authorized location client. In this case the location request is shown as being transmitted via the gateway however in some cases the location server may have a direct connection to a suitable channel, without needed to send via the location gateway.

A location measurement response is sent from the client to the location server either in response to a request from the server or possibly in response to an event within the client. This could include a user request via the GUI, or an existing trigger such as a periodic reporting regime. In this case the response is directed to the gateway. While the ultimate destination for the response is the location server, to support a location calculation, the gateway forwards one copy to the location server as would be done in a conventional location services network configuration, and another copy to the network database server for use in the network model maintenance. A further role for the gateway in this context is a security role. It is likely that a desirable aspect of achieving user acceptance of this kind of service and the use of radio measurements from their devices is a strong assurance that information reflecting their location and movement patterns are not accessed by unauthorized parties. The network acquisition process described in this application does not require any user identification information. Therefore in forwarding measurement information to the network database server, the gateway discards any user identification information.

In FIGS. 16-19, the gateway, network database server and location server are shown as separate entities. It should be understood that this is a logical decomposition only. Optionally the physical configuration could correspond to this however in some cases two or more of these components could be run on a single host. Equally a distributed implementation could be employed with multiple hosts sharing each function for enhanced resilience and scaling as is well known in computer networking. In some cases the gateway and network database server could be deployed in conjunction with an existing location server product. Such an existing location server in carrier sponsored deployments would typically have a facility to receive a database describing the configuration of the radio network, such database being provided by the radio network management function within the carrier organization. Certain embodiments of the present disclosure enable such a product to be deployed in a carrier independent fashion with the network database server being substituted in the role previously carried out by the carrier radio network group. In some cases a reformatting step may be required between the network database server and the location server to accommodate the format required by the existing location server. The interfaces between the different entities will depend on the physical distribution and may include any inter process communication mechanism if deployed on a single host or any suitable network communication such as via FTP or HTTP or other application protocol over a LAN. Yet another possibility is via a database through shared table space.

Figure 17:
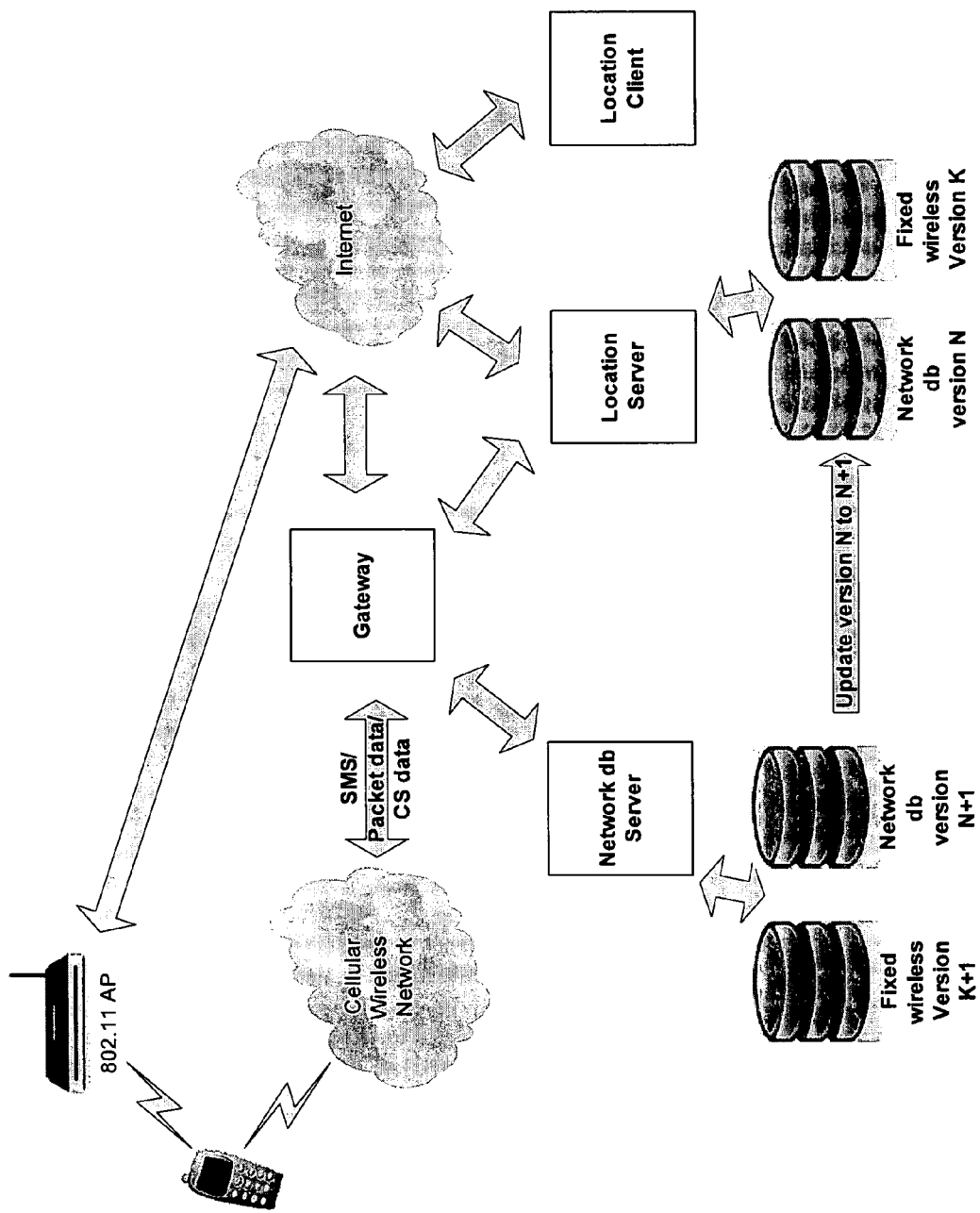
FIG. 17 illustrates another exemplary network architecture in accordance with certain embodiments.
Figure 18:
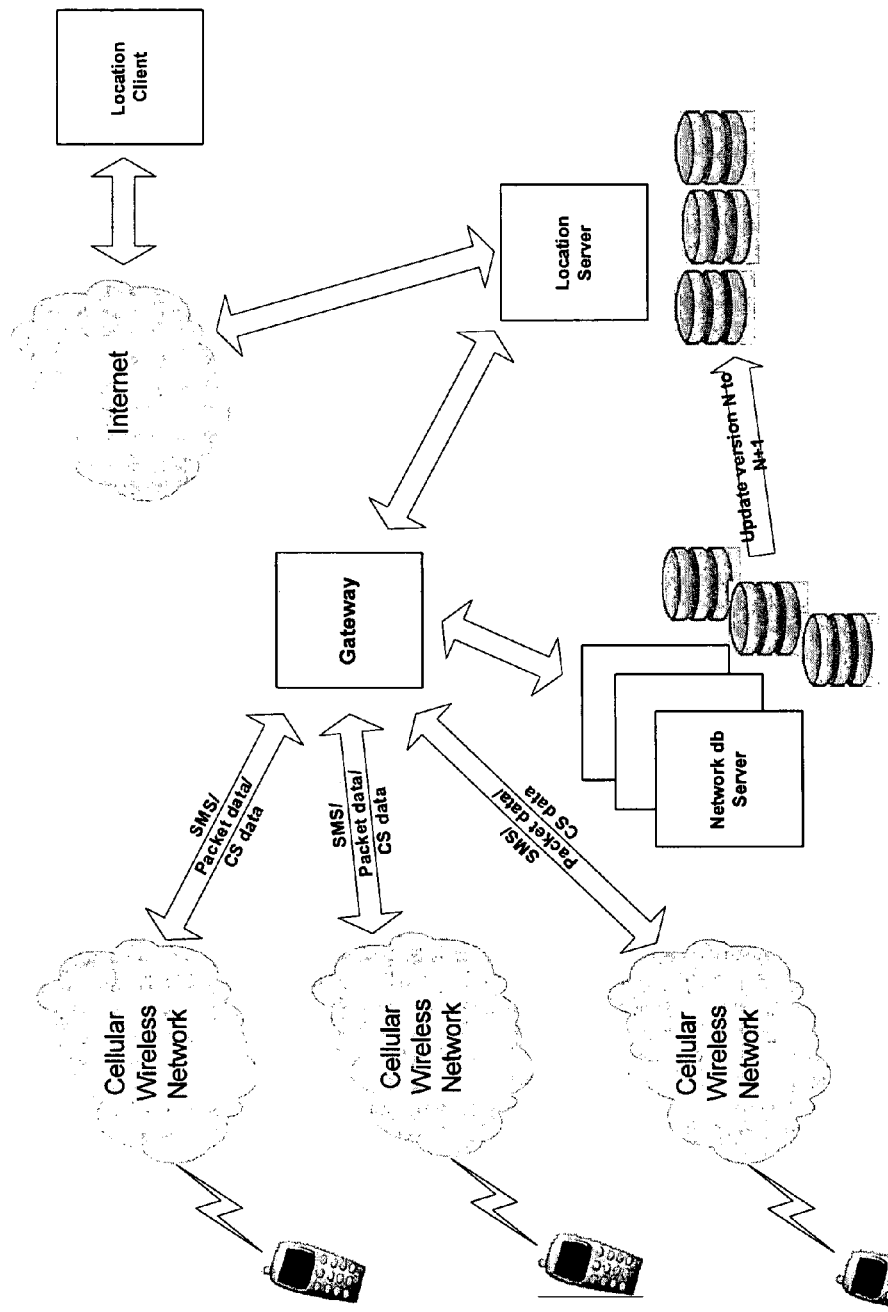
FIG. 18 illustrates still another exemplary network architecture in accordance with certain embodiments.
Figure 19:
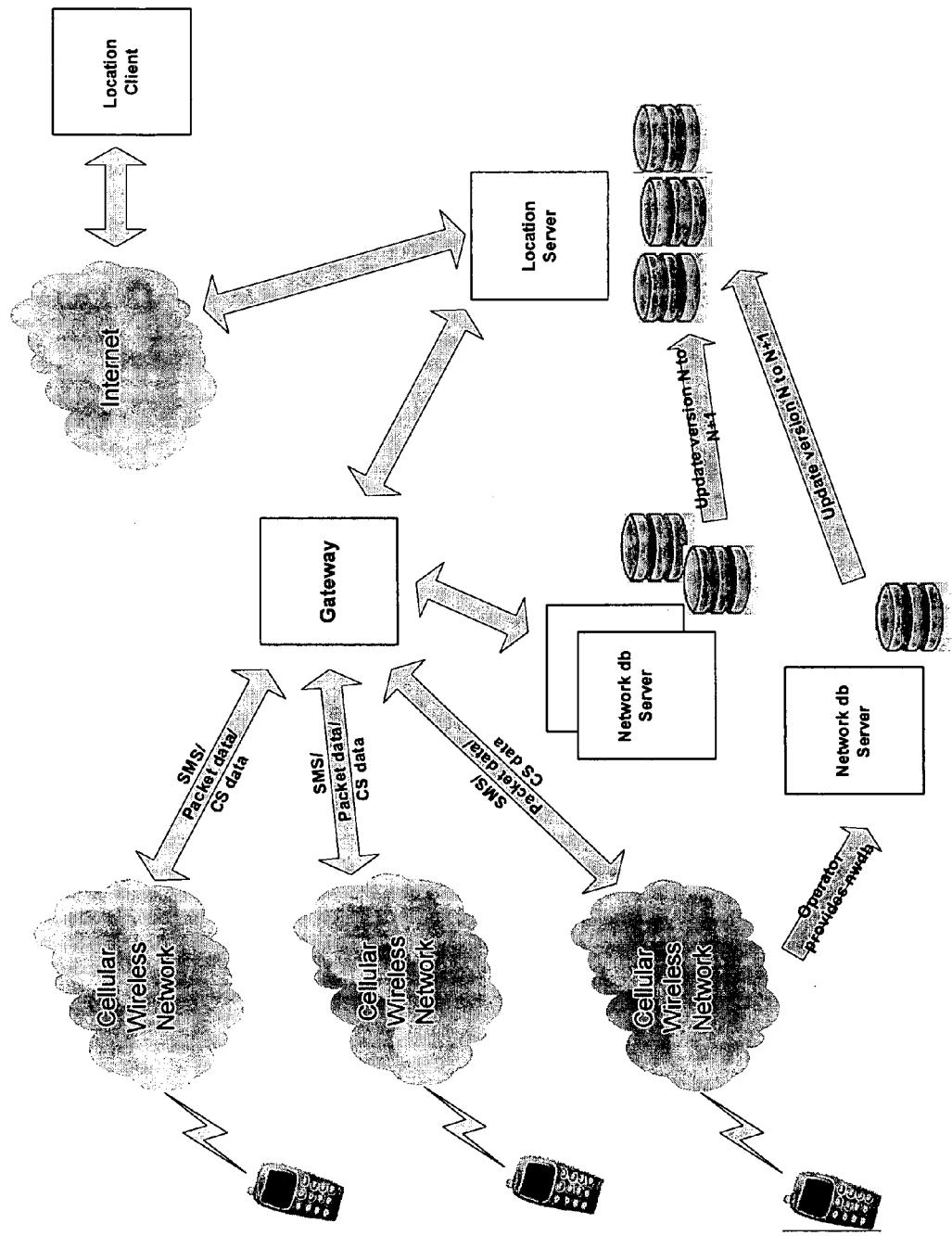
FIG. 19 illustrates still another exemplary network architecture in accordance with certain embodiments.

FIG. 17 shows an extension from the single mobile wireless network shown in the previous section, in which a dual mode device is operated by the user. In this case the user can connect the device either through the cellular network and/or a fixed wireless network. The fixed wireless network in this case could be, for example, a public Wi-Fi Access Point or alternatively a private Wi-Fi AP integrated with the user's fixed broadband router at home.

The network database server in this case can be configured to maintain information on the fixed wireless network access points as well as the cellular network base stations, depending on the requirements of the applications that will use the location determining capabilities of the location server. In some cases it may only be desirable to determine location while the device is connecting through the mobile wireless network. For the purposes of this explanation we will assume that both the cellular and the fixed networks are to be monitored.

In this case the interactions between the servers and the client application are essentially the same as described previously. The only differences are that the measurements collected by the client and reported to the server may from time to time include measurements pertaining to the fixed wireless network (SSID, MAC address & RSSI) and the reports may be delivered to the gateway via either the mobile wireless network or via a fixed wireless network connection and the internet. For network originated messages to the server, the gateway will typically use the cellular network since the destination address (MSISDN) remains fixed regardless of where the device is located.

FIG. 17 shows the network database server maintaining models for both the mobile wireless network as well as the fixed wireless network. Note that although the fixed wireless access points accessed by the device may include access points that are either privately owned or operated by one or more access providers, they are modeled in the network database server as part of a single Wi-Fi network. The fact that they are operated by different providers cannot be determined from the radio information reported by the device. In any case, the affiliation of the access point is of no consequence in determining the location of the access point and in turn using that information to determine the location of devices accessing it.

Figure 20:
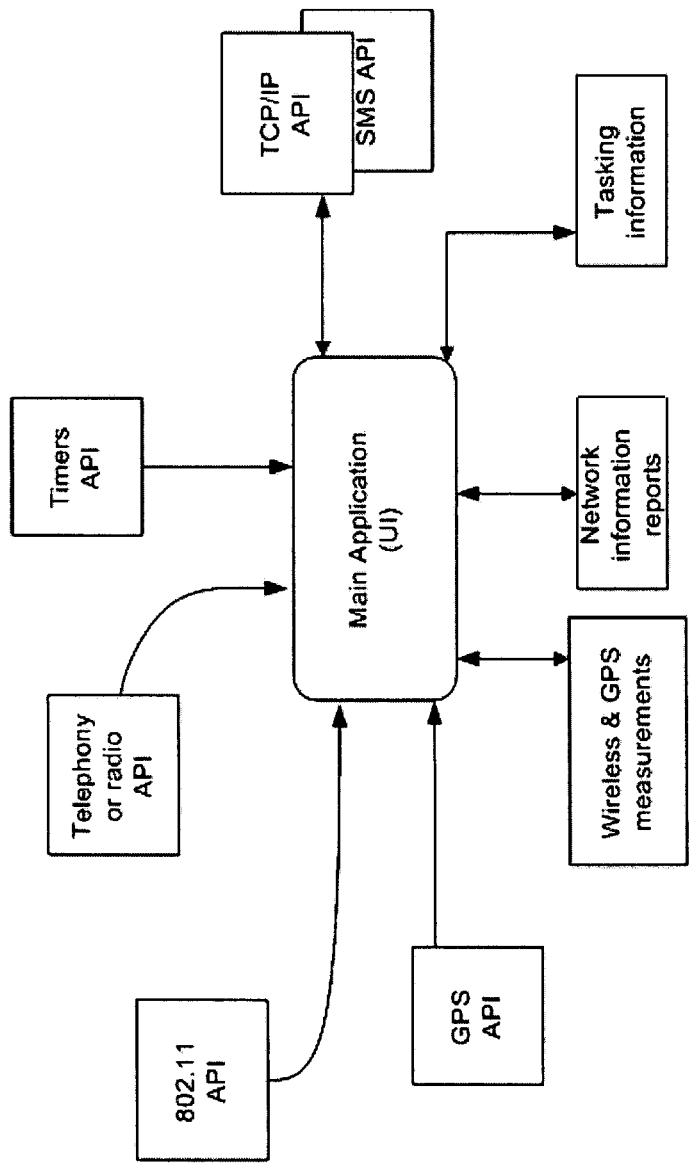
FIG. 20 illustrates an exemplary client application in accordance with certain embodiments.
Figure 21:
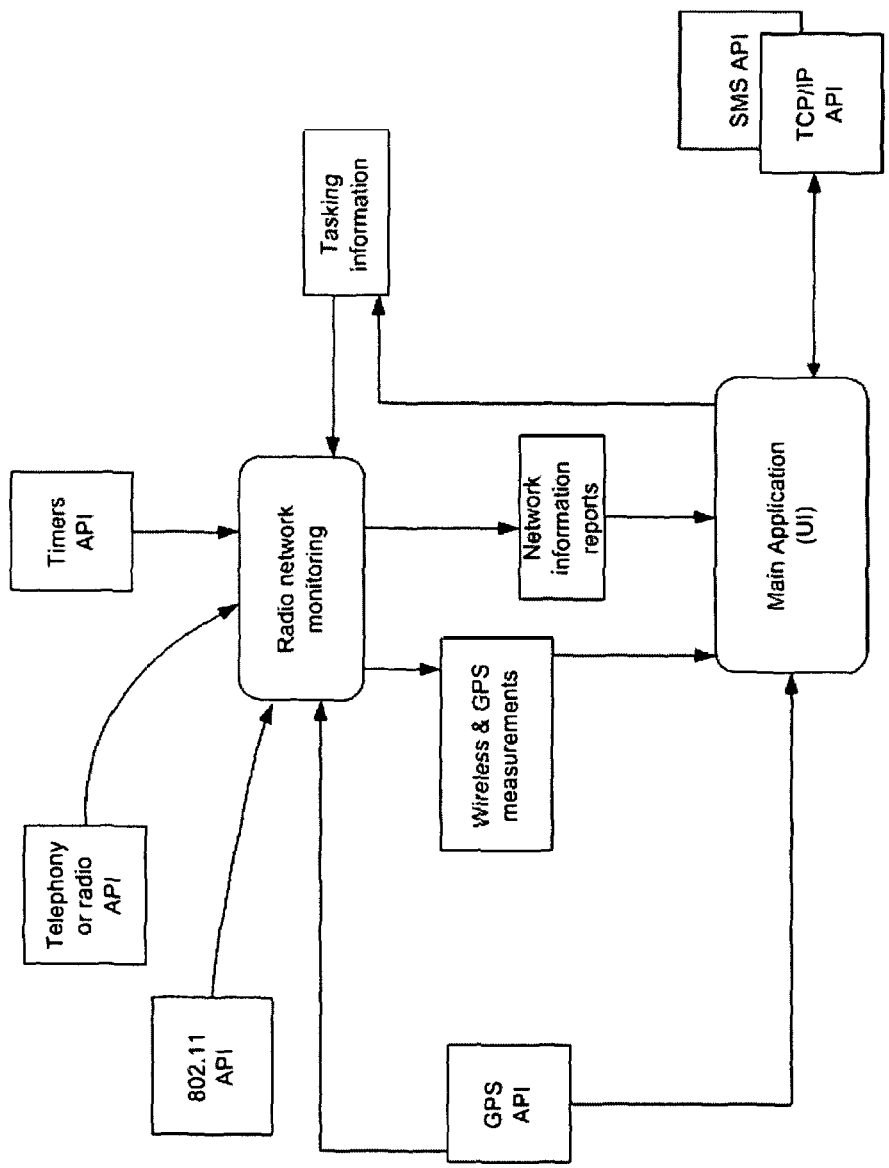
FIG. 21 illustrates another exemplary client application in accordance with certain embodiments.

FIGS. 20 and 21 illustrate two exemplary architectures for the client software. These figures focus on the network acquisition aspect of the application. The remaining application functionality could involve mobile mapping or instant messaging or any other functionality. Indeed the network acquisition related functionality described here could be implemented in the form of a library, suitable for integration by third party application developers into their applications thereby accessing the benefits of widely accessible location.

The network acquisition aspect monitors the network, detects any measurements that could be useful in maintaining the network model, and transfers these to the server. In FIG. 20, the application features a single component, (in some implementations corresponding to a single operating system process). This process makes use of various system interfaces to obtain information and services. In the figure the Symbian CTelephony interface is used as an example of the interface for accessing radio network measurements. By invoking the applicable methods the application can obtain the following information for the current serving cell: MCC, MNC, LAC, cell ID & RSSI. The application also can use application programming interfaces (APIs) to retrieve GPS location fixes (if supported on the specific device). Tasking information may be sent from the network database server to the application. Such information is stored for use in identifying patterns of measurements to report to the server.

In certain embodiments, this application runs only when launched by the user until the user exits the application, in which case the measurement processing occurs only during this period. In alternative embodiments, the user may be able to select whether they want the application to execute automatically. Once the user has launched the application, measurement collection may commence regardless of whether the user is currently executing any actions that require radio network measurements. In alternative embodiments, the user may be able to select how and/or when the measurement collection commences. The measurement collection may be done periodically, triggered by a timer. The interval could be any suitable value between a few seconds or several tens of seconds. The lower limit on the interval is the minimum interval at which one could expect the terminal to reselect serving cell. If a pattern of measurements is observed which matches some criteria in the tasking information, a measurement report is created and stored in the network reports. A separate component of the application is responsible for monitoring for the availability of a suitable communication link to send network reports to the server.

FIG. 21 shows an alternative architecture in which there are two separate components, typically implemented as two separate processes. One is a background process which is launched when the application is first installed and activated. The other is the main component of the application that presents the UI. Both components would typically be part of a single install file. The interface between the two components can be via any suitable Inter-Process Communication (IPC) mechanism supported by the particular device platform, including sockets. Several data stores are shown in the figure. It is uncommon for different processes to be able to access the same shared data. Therefore in the present context the data store could be maintained by one or other process and necessary information passed to the other process on request via IPC. To illustrate, the tasking information would typically be received by the GUI component which handles user initiated connections with the network. The information would then be transferred to the background component which makes more frequent use of it, and save by that process in private storage.

The background process is responsible for periodically collecting radio measurements, updating the measurement filter and also analyzing the measurements for any patterns that match criteria in the tasking information. In the event that a pattern is found, a network report is prepared and saved for subsequent reporting to the network database server. The background process also reads GPS measurements from the GPS API (on supported devices) whenever available. In some platforms, the GPS API supports a register/notify pattern, in this case enabling the background process to register to be alerted when a GPS fix is obtained or when the GPS position changes substantially from a previous fix.

The main component is responsible for the main application functionality. Typically this will include some form of location based functionality. When the user activates this functionality (for instance requesting a map of the current location from an application server), the main process triggers a location request to the server along with the rest of the information pertaining to the user's request. To send a location request the main process retrieves a measurement report from the measurement filter (i.e., via IPC with the background process) and then conveys this to the server via the current preferred connection (for instance via HTTP as a MIME attachment or via raw TCP/IP over Wi-Fi, GPRS, EDGE, HSPA, EV-DO or even SMS). The remainder of the processing on the application server to pass the measurement information to a location server, plus satisfy the user request is not covered here as the focus is on the architectural aspects of the client application, in particular as it relates to wireless network database acquisition.

In an alternative situation, the background process might also directly access the communications services supported by the device in order to communicate with the server. In general for mobile devices, where data exchanges incur a charge as well as significantly draw on the battery, applications designers prefer to leave it to the user to initiate connections.

The following paragraphs describe the platform facilities that a Window Embedded CE client could use to implement the processing described above. To obtain the cellular information, the client can use the GetCellTowerInfo function supported by the Radio Interface Layer dll. Among the information available by using this function are the MCC, MNC, LAC & cell ID and rxLev.

GPS location information (on devices which include GPS hardware) the client can read the GPS using the Location Framework by calling LocationGetReport( ). The client would specify the LOCATION_LATLONG_GUID report type and pass an appropriately large value for the maximumAge. This could for instance correspond to the interval at which the client measurement filter is being refreshed. By requesting a report without first calling LocationRegisterForReport( ), the client application can avoid powering on the GPS and depleting the battery, but can also take advantage of fixes that are available when the user or another application has activated the GPS.

For reading Wi-Fi information, once again the Location Framework can be used. The client application can invoke a LocationGetReport( ) request, specifying the LOCATION_802_11_GUID report type and passing a relatively large maximum age as above for the lat/long request. As with the GPS request, the application can take advantage of Wi-Fi information if it is available without having to power on the 802.11 network hardware and consume power in a scan. Other details about initializing libraries etc would be easily determined by one familiar with Windows CE programming, using the reference documentation.

The client implementation on other mobile device platforms uses equivalent facilities supported by those platforms as would be understood by one familiar with mobile applications development.

In a system where a large number of measurements from user devices are being accumulated, it may be advantageous to implement quality control capabilities to protect against either unintended or malicious degradation of the system by the transmission of false information. One example in the present context would be a hacker implementing a fake client which transmitted a stream of reports combining cellular or fixed wireless transmitter identifiers with incorrect GPS coordinates. Without suitable quality control measures, this stream of reports would corrupt the database, degrading or even disabling service for legitimate users.

Measures for protecting against this type of attack include authentication between the client and the server and use of secure transport to preserve the contents of the messages from modification in transit.

Another type of attack would be a flood of either network reports or location requests. Certain embodiments of the present disclosure provide a collection of methods for protecting against such denial of service (DOS) attacks. Certain embodiments also include a fallback where in the case of a DOS attack the system can discard requests that don't originate from cellular networks (this may be effective because it is unlikely that users seeking to maliciously introduce erroneous data into the system would use cellular data with the associated charges to implement such an attack).

As the penetration of clients grows, the server may accumulate a substantial volume of data on the coverage and performance of the wireless networks used by the client devices. This can be used to detect network issues such as black spots where there is frequent reselection between cells or between RATs. Locations where dual-mode cellular terminals frequently reselect between GSM & UMTS are a common source of irritation for cellular subscribers. Certain embodiments of the present disclosure also can provide the ability to directly measure the footprint of cells. These measurements can be provided to radio network engineers to compare with the footprints predicted by their planning tools in the form of best server polygons etc, in turn enabling the tools to be updated to more accurately reflect the real coverage of the cells. Cell overshoot is a common performance problem that can be detected in this way. A further capability of certain embodiments is the ability to measure the effect of network adjustments over time. Data collected before and after an adjustment can be compared to determine whether the change had the desired effect. Using the example of a cell having excessive overshoot in a particular direction, data collected after an increase in the tilt was applied can be compared to the data recorded beforehand to assess the degree to which the adjustment was successful in addressing the change.

In addition to the performance and footprint of the network, certain embodiments can also collect information on the spatial patterns of usage. If the server is integrated with application servers supporting VOIP, IM, browsing etc., then those servers can accumulate statistics on the location distribution of traffic by obtaining location information for archiving along with traffic information. This information can be made available to the access provider for use in their network planning and optimization. The data can also be segmented by service type enabling more accurate planning, taking into account the different requirements of these different services, for instance the lower latency requirements of VOIP compared to browsing.

Another scenario where such information can be useful is for operators establishing a new network, for instance after the award of a new radio frequency spectrum license. A common challenge in such cases is to determine the capacity required and its spatial distribution. Assuming that the operator of a server in accordance with certain embodiments of the present disclosure is not affiliated with the current cellular access providers, spatial, traffic density data for existing networks could be provided to the new entrant to guide their network planning activities.

This type of spatial traffic distribution data could also be used by different access providers to determine where users are favoring alternative access providers over their own network. For instance a cellular carrier could obtain data showing the relative proportions of VOIP calls being placed on their network to the proportion being placed on competing access provider networks, for instance Wi-Fi hotspots. This type of data can enable an access provider to characterize their competition and develop new access product offerings tailored to the usage patterns of subscribers.

Certain embodiments described herein may have one or more of the following advantages.

One advantage of certain embodiments is that wireless network configuration data can be aggregated independently of the MNOs.

Another advantage of certain embodiments is being able to use data from non-GPS enabled wireless devices to further refine the configuration data.

Another advantage of certain embodiments is that the cellular network configuration data can be accumulated more rapidly because of the focused collection enabled by the tasking data. This is typically performed more quickly than a purely opportunistic approach such as is used in other systems.

Another advantage of certain embodiments is that the Wi-Fi network configuration data can be accumulated more rapidly because of the focused collection enabled by the tasking data. This is typically performed more quickly than a purely opportunistic approach such as is used in other systems. Moreover, this can be quicker, more accurate, and less expensive than relying on drive tests to collect the information that any user device can provide input.

Another advantage of certain embodiments is greater coverage, for instance with indoor pico cells that would be unlikely to be located by a GPS enabled handset because the GPS coverage indoors would prevent a simultaneous measurement of the cell and GPS fix.

Still a further advantage of certain embodiments is being able to determine location for dual mode wireless devices whether they are operating on a cellular network or have connected to a network operating in the unlicensed spectrum such as a Wi-Fi network.

Another advantage of certain embodiments is that the wireless network configuration data can be updated quickly responsive to changes in the wireless network.

Still a further advantage of certain embodiments is that a mobile radio terminal can determine its own location without relying on a location server.

Yet another advantage is that distributing tasking information to a plurality of mobile radio terminals allows certain embodiments to rapidly and selectively obtain information regarding wireless network transmitters that have not been accurately described in a wireless network database.

The disclosure has been described with reference to particular embodiments. However, it will be readily apparent to those skilled in the art that it is possible to embody the disclosure in specific forms other than those of the embodiments described above. The embodiments are merely illustrative and should not be considered restrictive. The scope of the disclosure is given by the appended claims, rather than the preceding description, and all variations and equivalents which fall within the range of the claims are intended to be embraced therein.

The reader's attention is directed to all papers and documents which are filed concurrently with this specification and which are open to public inspection with this specification, and the contents of all such papers and documents are incorporated herein by reference. All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example of a generic series of equivalent or similar features.

It will be understood that the term "comprise" and any of its derivatives (eg. comprises, comprising) as used in this specification is to be taken to be inclusive of features to which it refers, and is not meant to exclude the presence of any additional features unless otherwise stated or implied.

The reference to any prior art in this specification is not, and should not be taken as, an acknowledgement of any form of suggestion that such prior art forms part of the common general knowledge.

The invention claimed is:

1. A computer-implemented method of collecting one or more radio parameter measurements corresponding to wireless transmitters in a wireless network in order to update a database of wireless transmitter characteristics, the method comprising:
retrieving, from a database, a list indicating a current state of information in the database regarding one or more wireless transmitters in the wireless network, wherein the list includes one or more transmitter identifiers, and zero or more parameters associated with each transmitter identifier;
communicating the list to at least one device having one or more wireless receivers; and
receiving, with a server, a selected sequence of one or more radio measurements from a device having one or more wireless receivers comprising a GPS receiver, wherein the device selects the sequence by assigning a priority to sequences of one or more radio measurements based on the list of one or more transmitter identifiers and selecting at least one sequence of at least one of the one or more radio measurements based on the assigned priority, and when the priority assigned by the device exceeds a threshold, the device performs steps comprising:
activating the GPS receiver when the GPS receiver is not currently active;
attempting to obtain position information from the GPS receiver;
deactivating the GPS receiver; and
including obtained position information with the selected sequence received by the server.

2. The method according to claim 1 wherein the one or more transmitters are selected from a group consisting of GSM cells, UMTS cells, CDMA cells, LTE Cells and WiMAX cells.

3. The method according to claim 2 wherein the one or more transmitter identifiers comprise Cell ID values or Cell ID and LAC pairs.

4. The method according to claim 1 wherein radio measurements in the selected sequence of measurements include a transmitter identifier and a received signal level.

5. The method according to claim 1 wherein the list is communicated via a bearer selected from a group consisting of SMS, GPRS, EDGE, HSPA, and EV-DO.

6. The method according to claim 1 wherein a selection process of the device reduces traffic on a wireless network, reduces processing for a given increment in a quality of information in the database, improves updating of the database by reducing an amount of data transmitted, reduces an amount of processing by a server, and/or improves coverage of the database.

7. The method according to claim 6 wherein sending a selected subset of one or more radio measurements to the server from the device is initiated when an application on the device establishes a data connection.

8. The method according to claim 6 wherein the device having one or more wireless receivers includes a client application associated with the database, and wherein the client application establishes a connection to the server.

9. The method according to claim 1 wherein communicating the list to at least one device is requested by a client application on the device when a user of the device establishes a connection to the server.

10. The method according to claim 1 wherein the server associates a version number with each revision of the list and a client application on the device checks the version number of the list currently on the device against a latest version number at a server and only requests the list when a more recent version is available on the server.

11. The method according to claim 1 further comprising:
estimating or updating at a server a set of characteristics of at least one wireless transmitter based on the selected sequence of one or more radio measurements; and
when the server determines that substantial changes have occurred in the wireless network based on the set of characteristics, updating the list to accelerate reporting by mobile radio terminals in an affected region.

12. The method according to claim 1 further comprising:
estimating a set of characteristics for one or more wireless transmitters associated with transmitter identifiers included in the selected sequence of one or more radio measurements based on the one or more radio measurements;
updating the list to reflect stored characteristics for the one or more wireless network transmitters; and
communicating the list to at least one device having one or more wireless receivers.

13. A communication network configured for collecting one or more radio parameter measurements corresponding to wireless transmitters in a wireless network in order to update a database of wireless transmitter characteristics, the network comprising:
at least one server configured to perform a method comprising:
retrieving from a database a list indicating a current state of information in the database regarding one or more wireless transmitters in the wireless network, wherein the list includes one or more transmitter identifiers, and zero or more parameters associated with each transmitter identifier;
communicating the list to at least one device having one or more wireless receivers; and
receiving a selected sequence of one or more radio measurements from a device having one or more wireless receivers;
a device comprising a GPS receiver, the device configured to perform a method comprising:
performing one or more radio measurements;
selecting a sequence by assigning a priority to sequences of the one or more radio measurements based on the list of one or more transmitter identifiers, selecting at least one sequence of at least one of the one or more radio measurements based on the assigned priority, and transmitting a selected sequence to the at least one server, wherein when the priority assigned by the device exceeds a threshold, the device performs steps comprising:
activating the GPS receiver when the GPS receiver is not currently active;
attempting to obtain position information from the GPS receiver;
deactivating the GPS receiver; and
including obtained position information with the selected sequence transmitted to the at least one server.

* * * * *